(12) United States Patent
Scalora

(10) Patent No.: US 6,262,830 B1
(45) Date of Patent: *Jul. 17, 2001

(54) TRANSPARENT METALLO-DIELECTRIC PHOTONIC BAND GAP STRUCTURE

(76) Inventor: Michael Scalora, 15037 Ashmont Cir., Huntsville, AL (US) 35803

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,756

(22) Filed: Sep. 16, 1997

(51) Int. Cl.$^7$ ............... G02F 1/03; G02B 1/10; G02B 5/28; H01L 31/00
(52) U.S. Cl. ............ 359/248; 359/344; 359/580; 359/585; 359/586; 359/587; 359/588; 359/589; 257/451; 372/45
(58) Field of Search ................... 359/248, 344, 359/580, 585, 586–588, 589; 343/909, 911 R; 372/43, 45; 257/451

(56) References Cited

U.S. PATENT DOCUMENTS

| H182 | 1/1987 | Heller .................. 340/568 |
|---|---|---|
| 3,410,625 | 11/1968 | Edwards ............... 350/166 |
| 3,637,294 | 1/1972 | Berthold, III ......... 350/166 |
| 3,682,528 | 8/1972 | Apfel et al. ........... 350/1 |
| 3,697,153 | 10/1972 | Zycha .................. 350/166 |

(List continued on next page.)

FOREIGN PATENT DOCUMENTS

| 266424 | 11/1912 | (DE) . |
|---|---|---|
| 0 012 439 | 6/1980 | (EP) ................... 359/260 |
| 0 782 017 A2 A3 | 7/1997 | (EP) . |
| 0031278 | 7/1981 | (FR) . |
| 1406940 | 9/1975 | (GB) . |
| 59-151108 | 8/1984 | (JP) . |
| 64-80908 | 3/1989 | (JP) . |
| 2187732 | 7/1990 | (JP) . |
| WO 96/11516 | 4/1996 | (WO) . |

OTHER PUBLICATIONS

Macleod, H.A., *Thin–Film Optical Filters*, Second Edition, 1986, Macmillan Publishing Company, (copy of entire book provided).

Scalora et al., "Ultrashort Pulse Propagation at the Photonic Band Edge: Large Tunable Group Delay with Minimal Distortion and Loss," *Rapid Communications*, vol. 54, No. 2, pp. R1078–R1081, Aug. 1996.

"Indicators and displays. (Electrical–Electronics Reference Issue)", *Machine Design*, vol. 60, No. 11, p190(11), May 19, 1988.

Lewis, Clifford F., "Optical coatings: more than meets the eye", *Materials Engineering*, vol. 106, No. 11, p29(4), Nov. 1989.

Mooney, Thomas A., "Which coating process should I choose? (selecting a filter coating process)", *Lasers & Optronics*, vol. 7, No. 7, p39(4), Jul. 1988.

(List continued on next page.)

*Primary Examiner*—Georgia Epps
*Assistant Examiner*—Evelyn A. Lester
(74) *Attorney, Agent, or Firm*—Sterne, Kessler, Goldstein & Fox P.L.L.C.

(57) ABSTRACT

A transparent metal structure permits the transmission of light over a tunable range of frequencies, for example, visible light, and shields ultraviolet light and all other electromagnetic waves of lower frequencies, from infrared to microwaves and beyond. The transparent metal structure comprises a stack of alternating layers of a high index material and a low index material, at least one of the materials being a metal. By carefully choosing the thickness of the second material, the transparent window can be tuned over a wide range of frequencies.

43 Claims, 11 Drawing Sheets

U.S. PATENT DOCUMENTS

| | | | |
|---|---|---|---|
| 3,698,946 | 10/1972 | Kaspaul et al. | 117/211 |
| 3,706,485 | 12/1972 | Fawcett et al. | 350/164 |
| 3,759,604 | 9/1973 | Thelen | 350/166 |
| 3,853,386 | 12/1974 | Ritter et al. | 350/164 |
| 3,885,855 | 5/1975 | Gross | 350/1 |
| 3,889,026 | 6/1975 | Groth | 428/34 |
| 3,901,997 | 8/1975 | Groth | 428/428 |
| 3,914,023 | 10/1975 | Thelen | 350/164 |
| 3,978,273 | 8/1976 | Groth | 428/434 |
| 4,179,181 | 12/1979 | Chang | 350/1.7 |
| 4,189,205 | 2/1980 | Vandehei | 350/1.7 |
| 4,229,066 | 10/1980 | Rancourt et al. | 350/1.6 |
| 4,240,696 | 12/1980 | Tracy et al. | 350/163 |
| 4,269,481 | 5/1981 | Yeh et al. | 350/356 |
| 4,441,789 | 4/1984 | Pohlack | 350/166 |
| 4,488,775 | 12/1984 | Yamamoto | 350/164 |
| 4,525,687 | 6/1985 | Chemla et al. | 332/7.51 |
| 4,556,277 | 12/1985 | Fan et al. | 350/1.7 |
| 4,590,118 | 5/1986 | Yatabe et al. | 428/215 |
| 4,726,655 | 2/1988 | Mahlein | 350/166 |
| 4,756,602 | 7/1988 | Southwell | 350/166 |
| 4,770,496 | 9/1988 | Mahlein | 350/166 |
| 4,773,717 | 9/1988 | Pai et al. | 350/3.7 |
| 4,838,648 | 6/1989 | Phillips et al. | 350/166 |
| 4,846,551 | 7/1989 | Rancourt et al. | 350/166 |
| 4,915,494 | 4/1990 | Shipley et al. | 350/641 |
| 5,035,485 | 7/1991 | Kageyama | 350/164 |
| 5,071,206 | 12/1991 | Hood et al. | 359/360 |
| 5,111,329 | 5/1992 | Gajewski et al. | 359/275 |
| 5,119,232 | 6/1992 | Daley et al. | 359/359 |
| 5,148,504 | 9/1992 | Levi et al. | 385/14 |
| 5,170,290 | 12/1992 | Land et al. | 359/579 |
| 5,179,468 | 1/1993 | Gasloli | 359/359 |
| 5,187,461 | 2/1993 | Brommer et al. | 333/219.1 |
| 5,212,584 | 5/1993 | Chung | 359/260 |
| 5,225,930 | 7/1993 | Land et al. | 359/578 |
| 5,233,464 | 8/1993 | Costich | 359/359 |
| 5,239,406 | 8/1993 | Lynam | 359/275 |
| 5,247,528 | 9/1993 | Shinozaki et al. | 372/22 |
| 5,262,894 | 11/1993 | Wheatley et al. | 359/586 |
| 5,268,785 | 12/1993 | Crenshaw et al. | 359/244 |
| 5,302,449 | 4/1994 | Eby et al. | 428/336 |
| 5,315,430 | 5/1994 | Brennan et al. | 359/248 |
| 5,315,437 | 5/1994 | Alfano et al. | 359/588 |
| 5,337,183 | 8/1994 | Rosenblatt | 359/248 |
| 5,345,328 | 9/1994 | Fritz et al. | 359/248 |
| 5,355,245 | 10/1994 | Lynam | 359/267 |
| 5,372,874 | 12/1994 | Dickey et al. | 428/216 |
| 5,406,573 | 4/1995 | Ozbay et al. | 372/43 |
| 5,424,559 | 6/1995 | Kasahara | 257/21 |
| 5,433,988 | 7/1995 | Fukuda et al. | 428/141 |
| 5,440,421 | 8/1995 | Fan et al. | 359/344 |
| 5,448,404 | 9/1995 | Schrenk et al. | 359/584 |
| 5,457,570 | 10/1995 | Lu et al. | 359/361 |
| 5,471,180 | 11/1995 | Brommer et al. | 333/202 |
| 5,480,722 | 1/1996 | Tomonaga et al. | 428/428 |
| 5,493,442 | 2/1996 | Buccholz et al. | 359/359 |
| 5,506,037 | 4/1996 | Termath et al. | 428/216 |
| 5,513,039 | 4/1996 | Lu et al. | 359/584 |
| 5,514,476 | 5/1996 | Hartig et al. | 428/426 |
| 5,557,462 | 9/1996 | Hartig et al. | 359/585 |
| 5,559,825 | 9/1996 | Scalora et al. | 372/96 |
| 5,563,734 | 10/1996 | Wolfe et al. | 359/360 |
| 5,591,529 | 1/1997 | Braatz et al. | 428/457 |
| 5,595,825 | 1/1997 | Guiselin et al. | 428/428 |
| 5,615,289 | 3/1997 | Duck et al. | 385/24 |
| 5,740,287 | 4/1998 | Scalora et al. | 385/6 |
| 5,751,466 | 5/1998 | Dowling et al. | 359/248 |
| 5,796,902 | 8/1998 | Bhat et al. | 385/122 |
| 5,801,378 | 9/1998 | Habe et al. | 250/237 G |
| 5,909,035 | 6/1999 | Kim | 257/59 |

OTHER PUBLICATIONS

Akhmediev, N. et al., "Stability analysis of even and odd waves of symmetric nonlinear planar optical waveguides," *J. Opt. Soc. Am. B*, vol. 10, No. 2, Feb. 1993, pp. 230–236.

Bowden, C.M. et al., "Development and Applications of Materials Exhibiting Photonic Band Gaps," *J. Opt. Soc. Am. B*, vol. 10, No. 2, Feb. 1993, pp. 279–280.

Brown, E.R. et al., "Radiation properties of a planar antenna on a photonic–crystal substrate," *J. Opt. Soc. Am. B*, vol. 10, No. 2, Feb. 1993, pp. 404–407.

Bullock, D.L. et al., "Photonic band structure investigation of two–dimensional Bragg reflector mirrors for semiconductor laser mode control," *J. Opt. Soc. Am. B*, vol. 10, No. 2, Feb. 1993, pp. 399–403.

Chernov, V.E. and B.A. Zon, "Depolarization of laser radiation in a nonlinear medium," *J. Opt. Soc. Am. B*, vol. 10, No. 2, Feb. 1993, pp. 210–212.

Chu, D.Y. and S.–T. Ho, "Spontaneous emission from excitons in cylindrical dielectric waveguides and the spontaneous–emission factor of microcavity ring lasers," *J. Opt. Soc. Am. B*, vol. 10, No. 2, Feb. 1993, pp. 381–390.

Crook, R.J. et al., "Long–range optical modes supported by a strongly absorbing thin organic film," *J. Opt. Soc. Am. B*, vol. 10, No. 2, Feb. 1993, pp. 237–243.

De Martini, F. et al., "Spontaneous and stimulated emission in the thresholdless microlaser," *J. Opt. Soc. Am. B*, vol. 10, No. 2, Feb. 1993, pp. 360–380.

Dowling, J.P. and C.M. Bowden, "Beat radiation from dipoles near a photonic band edge," *J. Opt. Soc. Am. B*, vol. 10, No. 2, Feb. 1993, pp. 353–355.

Dutta, B. et al., "Squeezed states, photon–number distributions, and U(1) invariance," *J. Opt. Soc. Am. B*, vol. 10, No. 2, Feb. 1993, pp. 253–264.

Erdogan, T. et al., "Enhancement and inhibition of radiation in cylindrically symmetric, periodic structures," *J. Opt. Soc. Am. B*, vol. 10, No. 2, Feb. 1993, pp. 391–398.

Gaylord, T.K. et al., "Application of electromagnetics formalism to quantum–mechanical electron–wave propagation in semiconductors," *J. Opt. Soc. Am. B*, vol. 10, No. 2, Feb. 1993, pp. 333–339.

Genack, A.Z. and N. Garcia, "Electromagnetic localization and photonics," *J. Opt. Soc. Am. B*, vol. 10, No. 2, Feb. 1993, pp. 408–413.

Helmfrid, S. et al., "Influence of various imperfections on the conversion efficiency of second–harmonic generation in quasi–phase–matching lithium niobate waveguides," *J. Opt. Soc. Am. B*, vol. 10, No. 2, Feb. 1993, pp. 222–229.

Kilin, S.Ya. and I.I. Fedchenia, "Statistics of random spikes in the intensity of stimulated Raman scattering: initiation by spatially distributed fluctuations," *J. Opt. Soc. Am. B*, vol. 10, No. 2, Feb. 1993, pp. 199–209.

Kurizki, G. et al., "Quantum electrodynamics in photonic band gaps: atomic–beam interaction with a defect mode," *J. Opt. Soc. Am. B*, vol. 10, No. 2, Feb. 1993, pp. 346–352.

Leoński, W., "Squeezed–state effect on bound–continuum transitions," *J. Opt. Soc. Am. B*, vol. 10, No. 2, Feb. 1993, pp. 244–252.

Leung, K.M., "Defect modes in photonic band structures: a Green's function approach using vector Wannier functions," *J. Opt. Am. B*, vol. 10, No. 2, Feb. 1993, pp. 303–306.

Maradudin, A.A. and A.R. McGurn, "Photonic band structure of a truncated, two-dimensional, periodic dielectric medium," *J. Opt. Soc. Am. B*, vol. 10, No. 2, Feb. 1993, pp. 307–313.

Meade, R.D. et al., "Nature of the photonic band gap: some insights from a field analysis," *J. Opt. Soc. Am. B*, vol. 10, No. 2, Feb. 1993, pp. 328–332.

Montemezzani, G. et al., "Photorefractive charge compensation at elevated temperatures and application to $KNbO_3$," *J. Opt. Soc. Am. B*, vol. 10, No. 2, Feb. 1993, pp. 171–185.

Mossberg, T.W. and M. Lewenstein, "Radiative properties of strongly driven atoms in the presence of photonic bands and gaps," *J. Opt. Soc. Am. B*, vol. 10, No. 2, Feb. 1993, pp. 340–345.

Robertson, W.M. et. al., "Measurement of the photon dispersion relation in two–dimensional ordered dielectric arrays," *J. Opt. Soc. Am. B*, vol. 10, No. 2, Feb. 1993, pp. 322–327.

Smith, D.R. et al., "Photonic band structure and defects in one and two dimensions," *J. Opt. Soc. Am. B*, vol. 10, No. 2, Feb. 1993, pp. 314–321.

Sözüer, H. Sami and J. W. Haus, "Photonic bands: simple–cubic lattice," *J. Opt. Am. Soc. B*, vol. 10, No. 2, Feb. 1993, pp. 296–302.

Sugawara, T. et al., "Instability in a $CO_2$ sequence–band laser with a saturable absorber and vibration–to–vibration energy transfer processes," *J. Opt. Soc. Am. B*, vol. 10, No. 2, Feb. 1993, pp. 265–270.

Tong, B.Y. et al., "Fluorescence–lifetime measurements in monodispersed suspensions of polystyrene particles," *J. Opt. Soc. Am. B*, vol. 10, No. 2, Feb. 1993, pp. 356–359.

Wijekoon, W.M.K.P. et al., "Second–harmonic generation studies of differences in molecular orientation of Langmuir–Blodgett films fabricated by vertical and horizontal dipping techniques," *J. Opt. Soc. Am. B*, vol. 10, No. 2, Feb. 1993, pp. 213–221.

Yablanovich, E., "Photonic band–gap structures," *J. Opt. Soc. Am. B*, vol. 10, No. 2, Feb. 1993, pp. 283–295.

Zahavi, O. et al., "Study of amplified spontaneous emission systems by the ray–tracing technique," *J. Opt. Soc. Am. B*, vol. 10, No. 2, Feb. 1993, pp. 271–278.

Ziolkowski, R.W. and J.B. Judkins, "Full–wave vector Maxwell equation modeling of the self–focusing of ultrashort optical pulses in a nonlinear Kerr medium exhibiting a finite response time," *J. Opt. Soc. Am. B*, vol. 10, No. 2, Feb. 1993, pp. 186–198.

Ashcroft, Neil W. and Mermin, N. David, *Solid State Physics*, Holt, Rinehart and Winston, 1976, pp. xi–xii and 765–766.

Assanto, Gaetano, "Quadratic Cascading: Effects and Applications," *Beam Shaping and Control with Nonlinear Optics*, (ed. By Kajzar and Reinisch), 1998, pp. vii–viii and 341–374.

Ball, G.A. and Morey, W.W., "Continuously tunable single–mode erbium fiber laser," *Optics Letters*, vol. 17, No. 6, Mar. 15, 1992, pp. 420–422.

Bendickson, J.M. et al., "Analytic expressions for the electromagnetic mode density in finite, one–dimensional, photonic band–gap structures," *Physical Review E*, vol. 53, No. 4–B, Apr. 1996, pp. 4107–4121.

Bloemer, M.J. and Scalora, M., "Transmissive–properties of $AG/MgF_2$ photonic band gaps," *Applied Physics Letters*, vol. 72, No. 14, Apr. 6, 1998, pp. 1676–1678.

Bouché, N. et al., "Dynamics of gain in vertical cavity lasers and amplifiers at 1.53 μm using femtosecond photoexcitation," *Applied Physics Letters*, vol. 73, No. 19, Nov. 9, 1998, pp. 2718–2720.

Centini, M. et al., "Dispersive properties of finite, one–dimensional photonic band gap structures: Applications to nonlinear quadratic interactions," *Physical Review E*, vol. 60, No. 4–B, Oct. 1999, pp. 4891–4898.

Cojocaru, C. et al., "Active reflective via a phase–insensitive quadratic nonlinear interaction within a microcavity," *Applied Physics Letters*, vol. 74, No. 4, Jan. 25, 1999, 504–506.

D'Aguanno, G.D. et al., "Enhancement of $\chi^{(2)}$ cascading processes in one–dimensional photonic bandgap structures," *Optics Letters*, vol. 24, No. 23, Dec. 1, 1999, pp. 1663–1665.

DeSalvo, R. et al., "Self–focusing and self–defocusing by cascaded second–order effects in KTP," *Optics Letters*, vol. 17, No. 1, Jan. 1, 1992, pp. 28–30.

Dowling, J.P. et al., "The photonic band edge laser: A new aproach to gain enhancement," *Journal of Applied Physics*, vol. 75, No. 4, Feb. 15, 1994, pp. 1896–1899.

Fowles, Grant R., *Introduction to Modern Optics*, Second Edition, 1975, Holt, Rhinehart and Winston, pp. v–viii, 33–38, 52–55 and 96–103.

Grétillat, M.–A. et al., "Electrostatic Polysilicon Microrelays Integrated with MOSFETs," *Proceedings Of Micro Electro Mechanical Systems*, 1994, pp. 97–101.

Haus, J.W. et al., "Enhanced second–harmonic generation in media with a weak periodicity," *Physical Review A*, vol. 57, No. 3, Mar. 1988, pp. 2120–2128.

Joannopoulos, John D. et al., *Photonic Crystals: Molding the Flow of Light*, 1995, Princeton University Press, (copy of entire book provided).

Marion, Jerry B., *Classical Electromagnetic Radiation*, 1965, Academic Press, pp. ix–xv, 148–152, 170–177.

Martorell, J. et al., "Pseudo–metal reflection at the interface between a linear and nonlinear material," *Optics Communications*, vol. 144, Nos. 1–3, Dec. 1, 1997, pp. 65–69.

Pasachoff, Jay M. and Kutner, Marc L., *University Astronomy*, 1978, W.B. Saunders Company, pp. ix–xvii and 177–239.

Patent–Abstracts of Japan, vol. 018, No. 095 (E–1509), JP 05 299751 A, published Nov. 12, 1993.

Patent Abstracts of Japan, vol. 014, No. 468 (P–1115), JP 2187732, published Jul. 23, 1990.

Patent Abstracts of Japan, vol. 008, No. 081 (E–238), JP 59 000977 A, published Jan. 6, 1984.

Petersen, K.E., "Micromechanical Membrane Switches on Silicon," *IBM J. Res. Develop.*, vol. 23, No. 4, Jul. 1979, pp. 376–385.

Rao, Y.J. et al., "Spatially–multiplexed fiber–optic Bragg grating strain and temperature sensor system based on interferometric wavelength–shift detection," *Electronics Letters*, vol. 31, No. 12, Jun. 8, 1995, pp. 1009–1010.

Scalora, M. and Crenshaw, M.E., "A beam propagation method that handles reflections," *Optics Communications*, vol. 108, Nos. 4–6, Jun. 1, 1994, pp. 191–196.

Scalora, M. et al., "Dipole emission rates in one–dimensional photonic band–gap materials," *Applied Physics B*, Supplement to vol. B 60, No. 273, 1995, pp. S57–S61.

Scalora, M. et al., "Optical Limiting and Switching of Ultrashort Pulses in Nonlinear Photonic Band–Gap Materials," *Physical Review Letters*, vol. 73, No. 10, Sep. 5, 1994, pp. 1368–1371.

Scalora, M. et al., "The photonic band–edge optical diode," *Journal of Applied Physics*, vol. 76, No. 4, Aug. 15, 1994, pp. 2023–2026.

Scalora, M. et al., "Pulse propagation near highly reflective surfaces: applications to photonic band–gap structures and the question of superluminal tunneling times," *Physical Review A.*, vol. 52, No. 1, Jul. 1995, pp. 726–734.

Scalora, M. et al., "Pulsed second–harmonic generation in non–linear, one–dimensional, periodic structures," *Physical Review A*, vol. 56, No. 4, Oct. 1997, pp. 3166–3174.

Sprung, D.W.L. et al., "Scattering by a finite periodic potential," *American Journal of Physics*, vol. 61, No. 12, dec. 1993, pp. 1118–1124.

Sze, S.M., *Physics of Semiconductor Devices*, Second Edition, 1981, John Wiley & Sons, pp. ix–xii and 681–742.

Sze, S.M., *Semiconductor Devices: Physics & Technology*, 1985, John Wiley & Sons, pp. ix–xi and 252–467.

Tocci, M.D. et al., "Thin–film nonlinear optical diode," *Applied Physics Letters*, vol. 66, No. 18, May 1, 1995, pp. 2324–2326.

Ward, A.J. et al., "Photonic dispersion surfaces," *Journal of Physics: Condensed Matter*, vol. 7, No. 10, Mar. 6, 1995, pp. 2217–2224.

Yao, J.J. et al., "A Surface Micromachined Miniature Switch for Telecommunications Applications with Signal Frequencies from DC up to 4 Ghz," *Transducers '95*, 1995, pp. 384–387.

Yariv, Amnon and Yeh, Pochi, *Optical Waves in Crystals: Propagation and Control of Laser Radiation*, 1984, John Wiley & Sons, pp. vii–xi and 439–447.

PBG STRUCTURE ON SUBSTRATE

BULK SILVER ON SUBSTRATE

TRANSPARENT METALLO-DIELECTRIC PHOTONIC BAND GAP STRUCTURE

CROSS-REFERENCE TO RELATED APPLICATIONS

This application is related to the application "Photonic Bandgap Apparatus and Method for Delaying Photonic Signals," Ser. No. 08/584,403, now U.S. Pat. No. 5,751,466 by J. Dowling, M. Scalora, M. Bloemer, M. Tocci, C. Bowden, R. Fork, S. Reinhardt, and R. Flynn, filed on Jan. 11, 1996.

The full disclosure of this application is incorporated herein by reference as if reproduced in full below.

FEDERALLY SPONSORED RESEARCH AND DEVELOPMENT

This invention was made with Government support under Contract DAAH01-96-P-R010 awarded by the U.S. Army Missile Command. The Government has certain rights in the invention.

BACKGROUND OF THE INVENTION

1. Field of the Invention

This invention relates generally to photonic signal devices. In particular, this invention relates to a transparent metal device that utilizes a photonic band gap structure to transmit a selected range of wavelengths of the electromagnetic spectrum, such as the visible range, and to reflect all longer wavelengths.

2. Related Art

Recent advances in photonic technology have generated a trend toward the integration of electronic and photonic devices. In particular, this advance is due to the increased desire to utilize and manipulate "photonic signals", as opposed to electrical signals, to perform such functions as information transfer. A "photonic signal" is a generic characterization of light that includes the entire range of electromagnetic frequencies, from gamma to x-rays, from visible light to microwaves, down to radio frequencies and beyond. Photonic devices offer an array of advantages over conventional electronic devices. For example, they can provide enhanced speed of operation, reduced size, robustness to environmental changes, such as rapid temperature variations, increased lifetime, and the ability to handle high repetition rates. These structures can be made of semiconductor materials, ordinary dielectrics, or a combination of semiconductor and dielectric materials.

The intense theoretical and experimental investigations of these structures in recent years, photonic band gap (PBG) structures in particular, are evidence of the widely recognized potential that these new materials offer. These optical devices, whose operating principles are based on a combination of nonlinear medium response and the physics of the photonic band edge, are extremely compact in nature (only a few microns in length), and some have electronic counterparts. It is well understood that a medium becomes nonlinear when the index of refraction of the substance is no longer constant, and is function of the applied electromagnetic field.

For example, recent advancements in PBG structures have been made in the development of a photonic band edge nonlinear optical limiter and switch. See, "Optical Limiting and Switching of Ultrashort Pulses in Nonlinear Photonic Band-Gap Materials", M. Scalora, et al., *Physical Review Letters* 73:1368 (1994) (incorporated by reference herein in its entirety). Also, advancements in photonic technology have been achieved with the development of the nonlinear optical diode. See, "The Photonic Band-Edge Optical Diode", M. Scalora, et al., *Journal of Applied Physics* 76:2023 (1994) (incorporated by reference herein in its entirety). Additionally, a high-gain second harmonic generator based on these photonic principles has been achieved. See, "Pulsed second harmonic generation in photonic band gap structures", M. Scalora, et al., to appear in *Physical Review A*, 1997 (incorporated by reference herein in its entirety).

Under ordinary circumstances, however, the medium response need not be nonlinear in order for the interaction of the electromagnetic waves with matter to be useful. For example, the photonic band edge delay line makes use of the linear properties of the structure to drastically reduce the speed of a light pulse propagating through the structure without causing distortion of the pulse or scattering losses. See, "Ultrashort pulse propagation at the photonic band edge: large tunable group delay and minimal distortion and loss", *Physical Review E* 54:1078R (1996) (incorporated by reference herein in its entirety).

To use a simple illustration, substances are usually characterized by the degree to which they conduct electricity. Thus, a distinction can be made between good conductors (such as metals), insulators (such as glasses), and semiconductors (such as gallium arsenide), which under the right conditions can display properties common to both metals and insulators. The propagation of light inside these substances strongly depends on their conductive properties: metals are highly reflective, as well as absorptive, at nearly all light frequencies of interest, from long radio waves to short-wavelength ultraviolet (UV) light. On the other hand, some dielectric materials may be transparent across the spectrum (a slab of window glass, for example).

For Ulis reason, metals are routinely used for radiation shielding purposes, as in the case of microwave oven cavities, or for their reflective properties, such as in conventional household mirrors. On the other hand, dielectric or semiconductor materials are used in integrated circuit environments, in waveguides and directional couplers, for example, because they allow the unimpeded propagation of light beams with minimal losses. Therefore, it would be highly desirable, under certain circumstances, to have access to a substance that can act as a shield (or filter) for a certain range of frequencies such as microwaves, and yet be transparent in the visible portion of the spectrum, i.e., a transparent metal structure.

SUMMARY OF THE INVENTION

The present invention generally relates to a device and method of creating an optical shield (or filter) based on a transparent metal photonic band gap (PBG) structure. In particular, the present invention provides an arrangement of alternating relatively thin or thick metal layers and refractive material layers deposited on an opaque or transparent substrate. This alternating metal/refractive material layer structure can provide a high degree of suppression of incident ultraviolet, infrared and microwave radiation, while still providing substantial transmission in the visible region of the electromagnetic spectrum. By utilizing a PBG structure, the shielding device can include thick metal layers to provide a greater degree of isolation of unwanted radiation than for similar metal layer based filters that are not designed to take advantage of photonic band gap effects.

According to one embodiment of the present invention, a transparent metal photonic band gap apparatus is provided to transmit a predetermined magnitude of visible radiation and to reflect a predetermined magnitude of ultraviolet, infrared, and microwave radiation. The apparatus includes a transparent substrate, a plurality of metal layers, and a plurality of interstitial layers.

A first metal layer is deposited on the transparent substrate. This metal layer can be any transition metal, preferably silver, aluminum, copper, or gold. Subsequent metal layers may be the same metal or different metals than the first metal layer. The thickness of the metal layer depends on the user application, and can range from approximately 2.5 nanometers (nm) up to 50 nm. Metal layers can be thicker than 50 nm, depending on the amount of visible transmission required.

The first interstitial layer is then deposited onto the first metal layer. Again, the thickness of the interstitial layer depends on the user application, and can range from approximately 2.5 nm up to several hundred or even thousands of nanometers. This interstitial layer can be selected from a group comprising semiconductor materials, ordinary dielectrics, and a combination of semiconductor and dielectric materials.

Subsequent metal and interstitial layers are arranged in a similar, alternating manner. The subsequent metal layers can be the same or different metals, depending on fabrication considerations and the desired transmission properties of the device. Similarly, the interstitial layers can be the same or different refractive materials, depending on fabrication considerations and the desired transmission properties of the device. This arrangement of metal/interstitial layers forms a device that exhibits a photonic band gap structure. By altering the thicknesses of the metal and interstitial layers, the device changes its transmission characteristics, such that different ranges and different magnitudes of transmission and reflection can be achieved.

According to a second embodiment of the present invention, the transmission range (in the visible region) of the transparent metal PBG device can be altered by applying an external electromagnetic field to the device. Specifically, a voltage source can be applied to the interstitial layers of the device to change their inherent optical path length. By changing the optical path length of the interstitial layers, which space apart the metal layers, the photonic band gap structure of the device is altered. As a result, the visible transmission range and magnitude of the device is also altered.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

1. Overview and Discussion of the Invention

The present invention is directed toward a method for developing a transparent metal device. A transparent metal structure allows the propagation of visible light, while shielding against all other, possibly harmful electromagnetic radiation. The transparent metal device can be tailored to increase the signal output in the desired transparent frequency range and suppress the intensity throughput of unwanted radiation. In addition, the transparent window can be tunable to encompass a different range of frequencies, in the infrared range, for example. Further, the methods used to fabricate these devices can be straightforward. The manner in which this is accomplished is described in detail below.

2. An Example Photonic Band Gap (PBG) Structure

Before describing the invention in great detail, it is useful to describe an example structure in which the present invention can be implemented. The present invention provides an apparatus and method to fabricate a transparent metallic structure that possesses the properties of a transparent glass in the visible portion of the electromagnetic spectrum, yet is opaque for all longer wavelengths (or smaller frequencies) from infrared light to radio waves. The transparent metallo-dielectric device of the present invention is achieved with the utilization of a photonic band gap structure.

Figure 1:
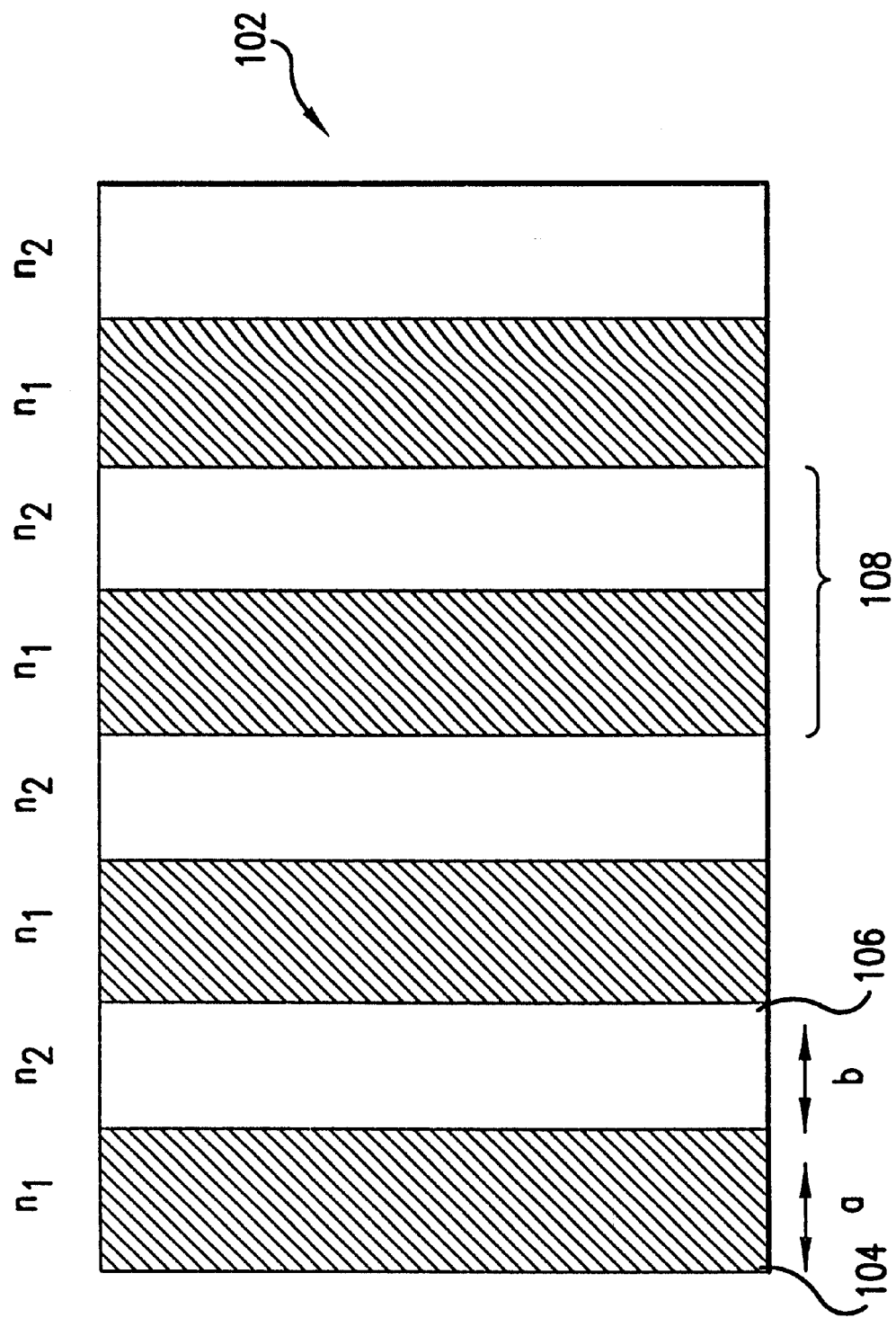
FIG. 1 is a schematic diagram of an exemplary photonic band gap (PBG) structure. The indices of refraction are $n_1$ and $n_2$ for each consecutive layer, with respective widths a and b. Each period is formed by the combination of two consecutive layers, and has width $d=a+b$.

A schematic illustration of an example photonic band gap (PBG) structure 102 is shown in FIG. 1. In one dimension, a PBG material is typically composed of a plurality of layers, whereby such plurality of layers alternates between a low and a high index of refraction. Each layer has a fixed index of refraction for low power incident photonic signals. For example, a first layer 104 can be chosen such that it is a high index layer. Next, a second layer 106 can be chosen to be a low index layer. One set of first and second layers is referred to as a period, such as period 108.

The widths of the first layer 104 and second layer 106 can also be chosen such that they are both a fraction of the size of a reference wavelength. For example, each layer can be one quarter of the reference wavelength. Thus, in this example, layer 104 can have a width (or thickness) (a), where $a=\lambda/4n_1$ and where $\lambda$ is the in-air wavelength of an incident photonic signal. Likewise, layer 106 can have a thickness (b), where $b=\lambda/4n_2$. This particular structure is referred to as a quarter-wave stack. As a consequence of this arrangement of the dielectric layers, light interference effects can cause some wavelengths of light to be transmitted through the structure, while another range of wavelengths centered about the reference wavelength, often referred to as "band gap" wavelengths, are completely reflected.

Figure 2:
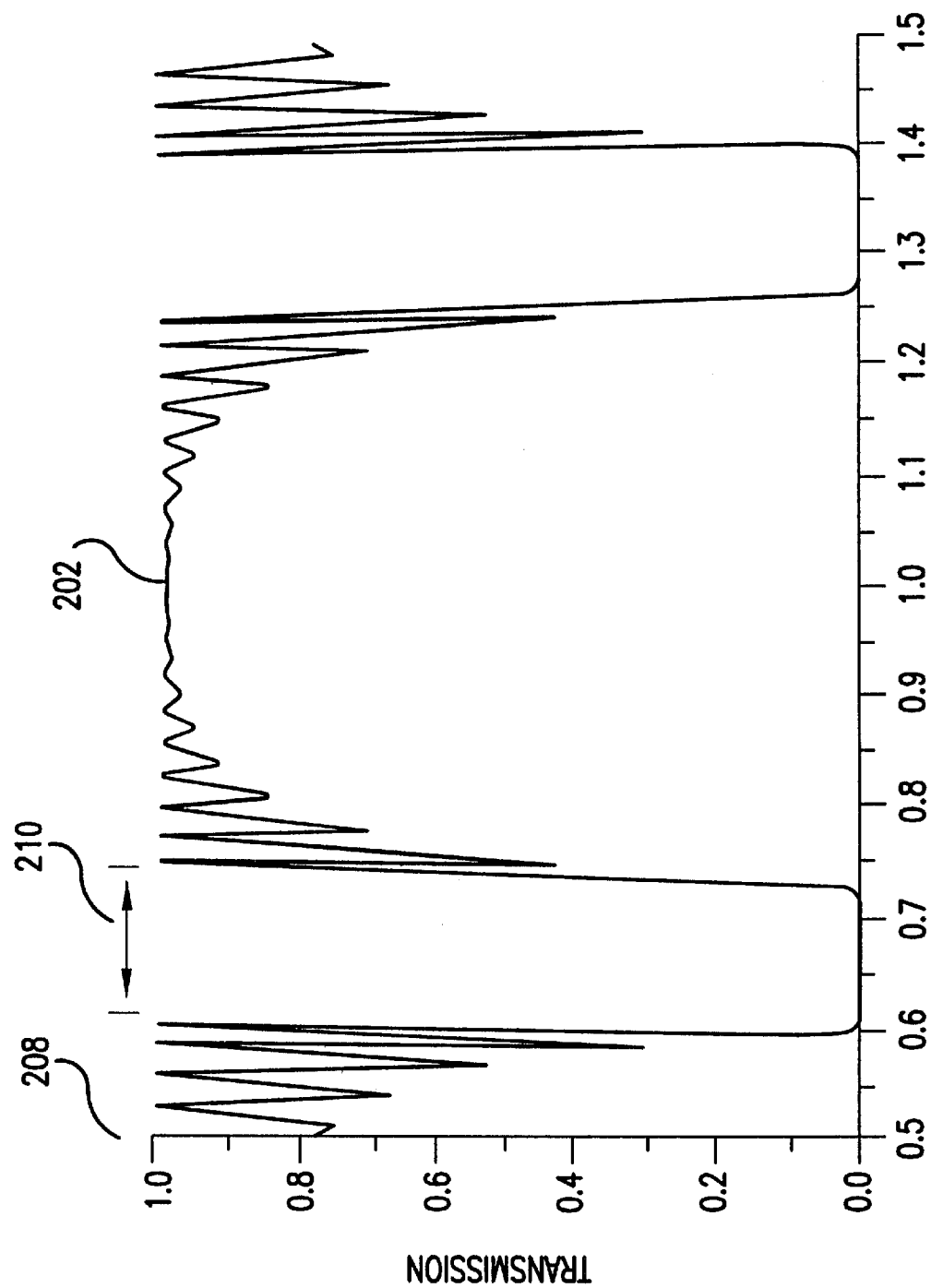
FIG. 2 is a transmittance vs. frequency profile for the exemplary PBG structure shown in FIG. 1.

FIG. 2 illustrates the transmissive properties of a similar example PBG structure. Transmission profile 202 is a plot of the transmission of light as a function of frequency from an example quarter-wave stack comprising 20 periods, or 40 alternating high/low index layers. A transmission of unity 208 corresponds to 100% of the photonic signal being transmitted. In this example, two dielectric materials are chosen. The first layer is a glass, with an index $n_1=1.41$. The second layer chosen is air, with an index $n_2=1$. By adjusting the width of the first and second layers, a shift of the location of the band gap to different wavelengths is created. This property provides significant flexibility in that a device can be designed to reflect a desired range of wavelengths, while providing for the transmission of other wavelengths.

Thus, a range of wavelengths about some reference wavelength cannot propagate inside this example device. On the other hand, this example PBG structure is transparent to other wavelengths, above and below the gap, such as gap 210 from FIG. 2. Therefore, it is the absence of those wavelengths from the transmitted photonic spectrum that gives rise to the name "band gap." Please note that this terminology is analogous to the electronic "band gap" described in semiconductors, where electrons having a specific range of energies cannot propagate through a semiconductor region. This analogy, however, is used for illustrative purposes only.

At wavelengths outside the photonic band gap, i.e., in a range above and below the band gap, a series of transmission resonances and gaps can be obtained, as depicted by transmission profile 202 of FIG. 2. The number of such resonances is equal to the number of periods that make up the structure. The width of these resonances and gaps is a function of the total number of periods, the indices $n_1$ and $n_2$, and the difference in index ($\delta n$), where $\delta n = |n_2 - n_1|$, and is known as the index modulation depth.

The present invention is described in terms of this example structure. Description in these terms is provided for convenience only. It is not intended that the invention be limited to application in this example structure. In fact, after reading the following description, it will become apparent to a person skilled in the relevant art how to implement the invention in alternative environments. In the drawings, the thicknesses of layers and regions are exaggerated for clarity.

3. Transmission and Reflection Properties of Metallic Structures

Typically, the materials used in the fabrication of PBG structures, or integrated circuits in general, are either dielectric or semiconductor substances, due to their low absorption characteristics. The choice of materials can also be dictated by a specific need, material properties, or by available fabrication techniques. An overriding concern, however, is that the chosen materials should not absorb light to any significant extent, so as not to compromise device operation. For this reason, metallic substances are almost exclusively used to enhance the reflective properties of dielectric or semiconductor materials. Enhanced reflective properties are thus achieved by designing and incorporating within a particular dielectric or semiconductor device thick metallic films, such as silver, nickel, copper, aluminum or gold.

Theoretical calculations show that the reflectivity of metallic structures can be enhanced with respect to bulk metal if the metal is arranged to form a periodic structure. For example, a 256 aluminum/air periodic structure was designed so that the reflection from such a structure increased when compared to bulk aluminum from 96% to approximately 98% for a small range of frequencies. Each metal film was assumed to be approximately 2.5 nm in thickness. See "Photonic dispersion surfaces", A. J. Ward, et al., *Journal Physics Condens. Matter* 7:2217 (1995) (incorporated by reference herein in its entirety).

However, the properties of aluminum do not allow the fabrication of uniform films with such a small thickness (less than 2.5 nm thick). Even if such small thickness films could be realized with aluminum or other metals, such a structure would be opaque to electromagnetic waves of all wavelengths, as calculations show. Therefore, it is desirable to utilize thicker metal layers in a PBG structure for a variety of applications.

According to the present invention, a photonic device based on a PBG structure comprising thick or thin metal layers is provided. This transparent metal PBG device propagates light through these metal films and renders these structure transparent to visible light. This phenomenon is best explained through focusing specifically on the transmissive properties of PBG structures.

Structures that contain at most two silver layers, each about 10–15 nm in thickness, sandwiched between silver nitride layers, have been described. See, e.g., U.S. Pat. No. 5,557,462, to Hartig et al and U.S. Pat. No. 4,179,181 to Chang (each incorporated by reference herein in its entirety). However, these conventional structures still allow anywhere from 5% to 50% transmission of light energy in the infrared (IR) wavelength range and as much as 20% of near UV radiation (320–400 nm). For example, screening IR light from the sun corresponds to reflecting wavelengths between 750 and 2500 nm, where most of the infrared solar emission is found. See, *University Astronomy*, J. M. Pasackoff and M. L. Kutner, W. D. Saunders Company, 1978, especially Chapter 8 (incorporated by reference herein). Consequently, since heat energy is reflected, any enclosed environment will tend to remain cooler longer than usual, even if exposure to sunlight persists. Hence, the present invention can be incorporated into coating processes designed to significantly lower cooling costs.

Additionally, tunable transmission bands with transmissive and reflective properties that resemble those of a good metal shields are desirable for a wide range of frequencies. According to the present invention, these types of transmission bands can be generated in structures comprising more than two silver layers. The conventional thought in this area, however, is that either an increase in thickness, or the presence of additional metal layers, can drastically reduce the transmission of visible light.

According to the present invention, the transmission of light at visible wavelengths does not change appreciably, and can be controlled effectively with a metallo-dielectric, periodic structure comprising more than two silver layers. Further, the reflective properties of the resulting transparent metal PBG structure can be as good as those found in metal shields for very low frequency (VLF, 1000 to 15000 Hz) and extremely low frequency (ELF, zero to 1000 Hz) radiation, present near high-power lines, and to some extent, near appliances and television sets.

It is well understood that light can actually propagate a small distance inside metals before it is mostly reflected. A small amount of light, on the order of 1% or less, is absorbed, and reappears as heat given off by the metal. This characteristic length depends on the wavelength of the incident light, and it is referred to as "skin depth". The "skin depth" is arbitrarily defined as the distance at which the value of the field has decreased to approximately 37% of the field value at the input surface of the metal. See *Classical Electromagnetic Radiation*, by J. B. Marion, Academic Press, 1965 (incorporated by reference herein in its entirety).

For example, the skin depth of metals such as aluminum, silver, or gold is between 4 and 10 nm at visible wavelengths (where the wavelengths of visible light comprise the range of approximately 400–700 nm). On the other hand, the skin depth for a typical metal at microwave wavelengths can be tens of microns (typical microwave wavelengths can be on the order of centimeters and meters). This implies that externally incident waves will propagate approximately these respective distances inside the metal, depending on the incident wavelength, before being substantially reflected. Therefore, a metal film whose thickness is in excess of 10 or 15 nm is usually considered a thick film for visible light, while extremely thin for microwave radiation and radio waves.

The term "skin depth" described above is a useful concept as long as light is incident on uniform, highly reflective metal films that are more than 1 micron ($\mu$m) thick. However, the term "skin depth" loses its conventional meaning in the case of a periodic structure, where the presence of closely spaced boundaries, i.e., spatial discontinuities of the index of refraction, alters the physical properties of the structure as a whole. Some of these properties include modification of the effective speed of light, suppression of absorption, and transmission and reflection coefficients.

4. Transparent Metal PBG Structures

The present invention is based on metallic PBG structures. In the preferred embodiment, a PBG device includes a plurality of alternating material layers. The first material component is a transition metal. For example, this metal can be gold, silver, copper, aluminum, tungsten, bismuth, or in general a good conductor of electricity with properties similar to those of gold, silver, copper, etc. The second material component is a dielectric or semiconductor material. For example, glasses such as quartz or magnesium fluoride ($MgF_2$) can be used, and semiconductors such as gallium arsenide, aluminum arsenide, or germanium can also be used. Further, any alloy or other material that can be combined with a metallic substance can also be engineered and used for this purpose. This combination of materials results in a new index of refraction and new absorption characteristics for the PBG structure. These properties can depend on the respective proportions of the materials used in the structure. It should be noted, however, that similar structures that use different metals can respond to the same photonic signal in very different ways. Also, the ordering of the metal/dielectric structure can be interchanged to a dielectric/metal structure without affecting the transmissive properties of the PBG structure.

As an example to illustrate the preferred embodiment of the present invention and its operation, a transparent metal PBG structure can be fabricated with the component layers of silver (Ag), a metal, and magnesium fluoride ($MgF_2$), a glass. Here, the total amount of Ag in the transparent metal PBG device can be hundreds of skin depths in thickness. Similarly, the thickness of the $MgF_2$ layers can also vary.

In particular, the transparent metal shielding device is a PBG structure comprising several alternating $Ag/MgF_2$ layers deposited on a glass, or any other suitable substrate. For some applications, it can be desirable that the transmitted range of frequencies not be in the visible range. Thus, the substrate can be opaque to visible light. For example, semiconductor substrates such as aluminum arsenide (AlAs) and gallium arsenide (GaAs) can also be used as a substrate, depending on what transmission window is desired.

Calculations to determine the theoretical transmission properties of the device can be performed using matrix transfer method and beam propagation method mathematical models. See, e.g., *Modern Optics*, by G. R. Fowles, Dover Publications, second edition (1975), and "A Beam Propagation Method that Handles Reflections", M. Scalora and M. E. Crenshaw, *Optics Communications* 108:191 (1994) (each incorporated by reference herein in its entirety).

The theoretical transmission properties of such a $Ag/MgF_2$ structure can be calculated as a function of wavelength (or frequency), as a function of the number of layers and/or layer thickness, and the incident angle of the input light beam. For purposes of the present invention, calculations were performed assuming an example glass substrate, whose index of refraction is approximately 1.5 for a wide range of incident wavelengths. It is well understood that the index of refraction of nearly all substances depends on the wavelength of the incident light. This physical principle is referred to as material dispersion, which can vary from substance to substance. For purposes of the present invention, the substrate functions to hold the metal/dielectric layers in place, and its exact physical properties can vary (i.e., the substrate need not always be transparent).

According to the present invention, a transparent metal PBG device can comprise a plurality of metal layers as thin as 10 nm (or thinner, as long as the properties of the layer are smooth and uniform throughout) and as thick as 50 nm or greater. These thickness values are intended as practical illustrations and are not intended to limit the present invention. In practice, this lower limit depends on available techniques that allow the metal film to be uniformly deposited on a substrate. The upper limit of the individual layer thickness can be dictated by a specific need. While 50 nm appears to be a reasonable upper limit in terms of most applications, some applications, such as arc welding, can require a metal layer thickness of greater than 100 nm.

Figure 3:
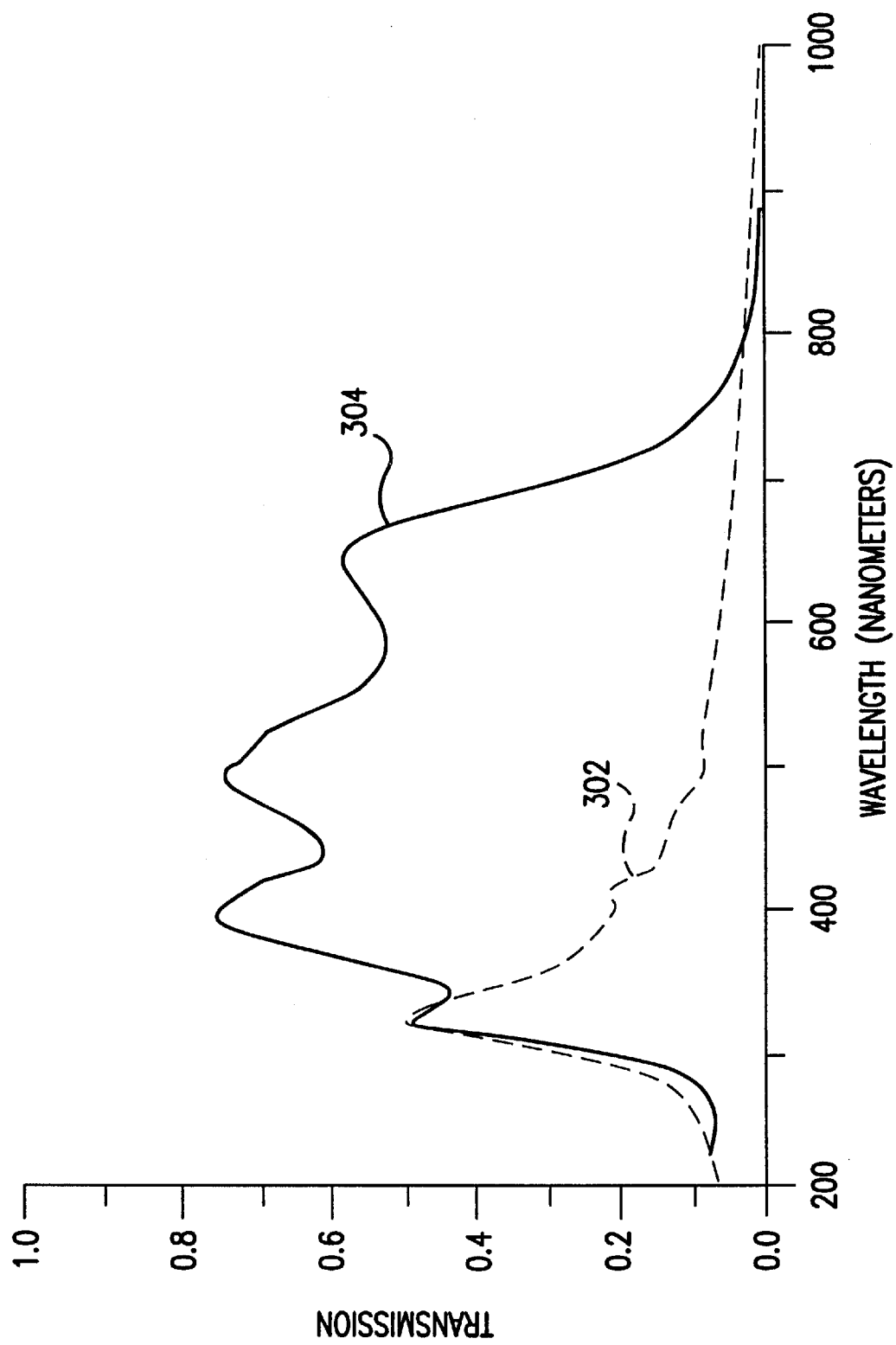
FIG. 3 is a transmission vs. wavelength profile for a 4-period PBG sample (solid line), where the silver (Ag) layers are 10 nm thick and the magnesium fluoride layers are 110 nm thick, and a solid silver film 40 nm thick (dotted line), in accordance with an embodiment of the present invention.

The present invention allows a user to determine a transmission profile based on a total metal thickness. A user can slice this total metal thickness into any number of individual metal layers in order to achieve the desired transmission window. For example, calculations show that a single Ag layer 40 nm in thickness suspended in air transmits 2.5% of the incident red light, 8% of green light, and about 15% of blue light. This transmission profile is illustrated in FIG. 3, dotted line 302. Thus, this example film is essentially opaque to visible light. However, if the original 40 nm Ag film is sliced into four Ag layers, each approximately 10 nm in thickness and spaced apart by approximately 110 nm thick $MgF_2$ layers, then the total transmission of visible light (400–700 nm) increases to an average of 70%. This is shown in the solid line 304 of FIG. 3.

Figure 4:
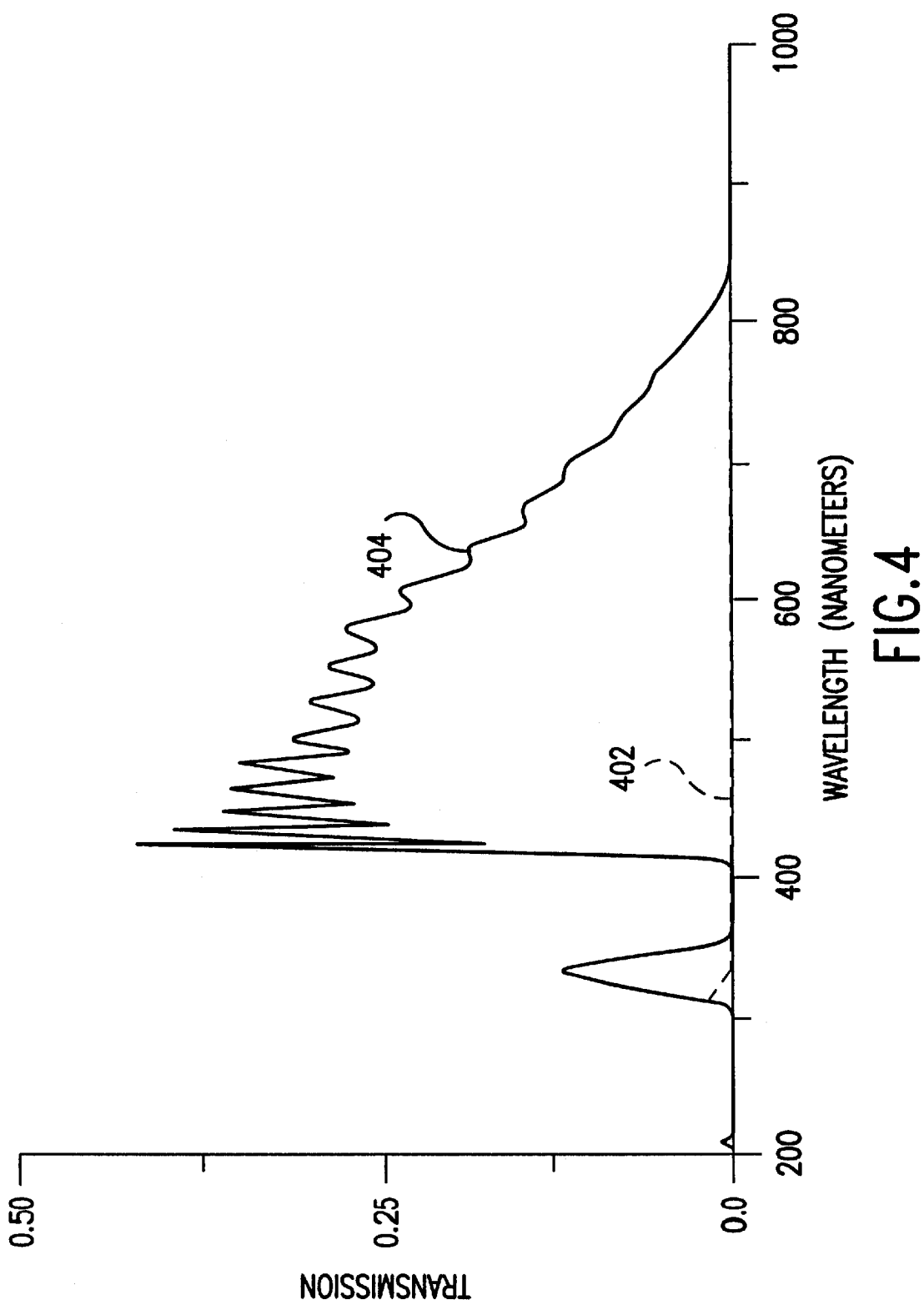
FIG. 4 is a transmission vs. wavelength profile for a 20-period PBG sample (solid line), where the silver layers are 10 nm thick and the magnesium fluoride layers are 140 nm thick, and the solid silver film is 200 nm thick (dotted line), in accordance with an embodiment of the present invention.

According to another example, a 200 nm thick Ag film is completely opaque to nearly all frequencies, allowing only $10^{-7}$ of the incident visible light to be transmitted. This is shown in FIG. 4, dotted line 402. On the other hand, if the original Ag film is sliced into 20 layers, each approximately 10 nm thick, and spaced apart by approximately 140 nm thick $MgF_2$ layers, then the average transmission in the visible range of frequencies increases to about 35%. This is shown in FIG. 4, solid line 404. The significant improvement in transmission for the multiple Ag/$MgF_2$ layer PBG structure is approximately seven orders of magnitude greater than for the single 200 nm Ag film structure. At the same time, the periodicity of the multiple Ag/$MgF_2$ layer structure described above also ensures better suppression of the transmitted light in the ultraviolet (UV) wavelength range (200–400 nm).

Generally speaking, adding more Ag/$MgF_2$ periods to the PBG structure causes a decrease in the transmitted light intensity. In addition, adding more Ag/$MgF_2$ periods can suppress the transmission of all lower frequencies and a good portion of the UV range. For example, a 40-period Ag/$MgF_2$ structure, where each Ag layer is 10 nm thick and each $MgF_2$ layer is approximately 200 nm thick, causes the average transmission of the device in the visible range to decrease to approximately 10%. At the same time, the transmission at all lower frequencies beginning in the near infrared (NIR) (at approximately 800 nm) is reduced to levels well below $10^{-20}$. This value represents an extremely high degree of isolation, with essentially zero transmission in the NIR. Please note that reducing the number of periods to 20, and doubling the thickness of the Ag layers to approximately 20 nm each yields approximately the same results. Furthermore, even fewer, but thicker Ag layers can be used to achieve approximately the same effect, thus adding flexibility to the design of a device for a specific purpose. As described in detail below, PBG structures can be fabricated that contain three periods, but where the metal layer thickness is approximately 30 nm. As is shown in FIG. 3, at visible wavelengths, a 30 nm thickness is considered a very thick metal film. Therefore, it would be ordinarily considered counterintuitive to add even more metal layers in order to improve the transmissive properties of the resulting structure.

Figure 5:
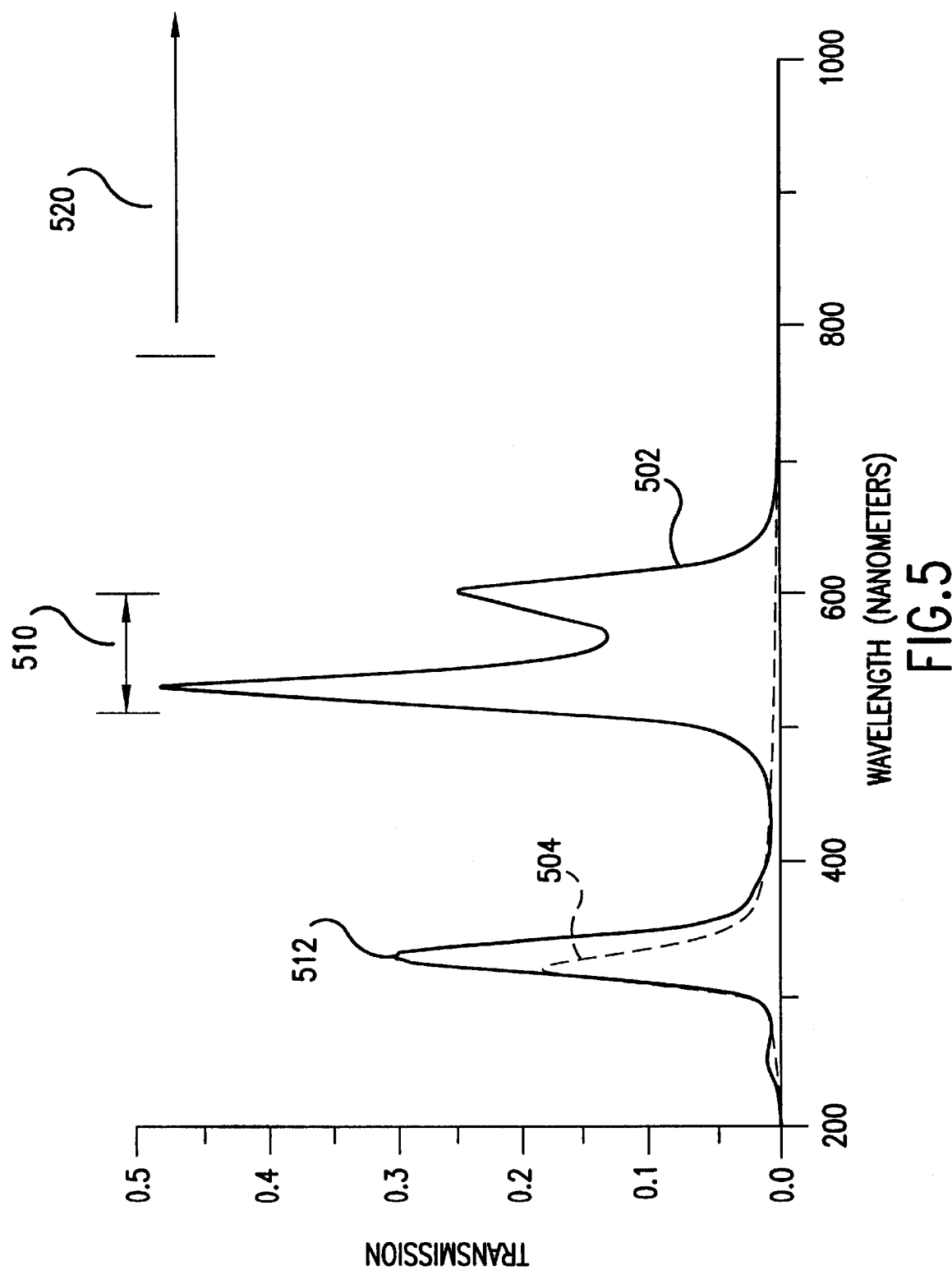
FIG. 5 is a transmission vs. wavelength profile for a silver/magnesium fluoride PBG sample (solid line), in accordance with an embodiment of the present invention, and the continuous silver film (dotted line), which are both shown schematically in FIGS. 6A and 6B.

FIG. 5 displays two transmission profiles. The solid line 502 represents the results of a theoretical calculation for the transmission of light as a function of incident wavelength from a PBG structure that comprises a glass substrate and a three period, Ag/$MgF_2$ PBG structure. Each Ag layer is approximately 30 nm thick, and each $MgF_2$ layer is approximately 150 nm in thickness. A schematic representation of this transparent metal PBG structure in shown FIG. 6A.

As a comparison, the transmission from a single layer, solid 90 nm Ag film is shown as the dotted line 504 in FIG. 5. A schematic representation of this PBG structure 650 in shown FIG. 6B. Thus, PBG structure 650 comprises the same total amount of silver as in the PBG structure 602 from FIG. 6A.

Further, FIG. 5 shows that the transmission from the solid metal film (dotted line 504) is approximately $10^{-3}$ in the visible range of wavelengths (from 400 to 700 nm). This transmission value is equivalent to approximately 30 decibels (dBs) of suppression in the transmitted light (where a factor of 10 change in transmission is equivalent to 10 dB of isolation). On the other hand, the maximum transmission (region 510) from solid line 502 (of the periodic PBG structure 602) is nearly 50% of the incident radiation, or four orders of magnitude greater compared to the solid Ag film 650. This maximum transmission is characterized by a peak in the green region (around 520 nm). Overall, this maximum transmissive range 510 extends over a substantial portion of the visible wavelength region.

A further transmission resonance 512 appears at approximately 320 nm, in the ultraviolet (UV) wavelength range. This UV transmission peak 512, however, is not due to the periodicity of the PBG structure 602, since it can be identified for both samples 602 and 650. The UV transmission peak 512 results from an inherent property of Ag, which becomes slightly transparent to UV radiation. This characteristic transparency disappears in either case, if the thickness of the metal film is further increased. For example, the ultraviolet transparency region is not present when gold and/or copper are used in a PBG structure, such as PBG structure 602, described above.

At longer wavelengths (region 520) beyond the visible range, the calculated transmission of light from the PBG structure is approximately $10^{-5}$ of its incident values, or 50 dBs of isolation. This behavior persists in the limit of infinite wavelength, or zero frequency.

Figure 7:
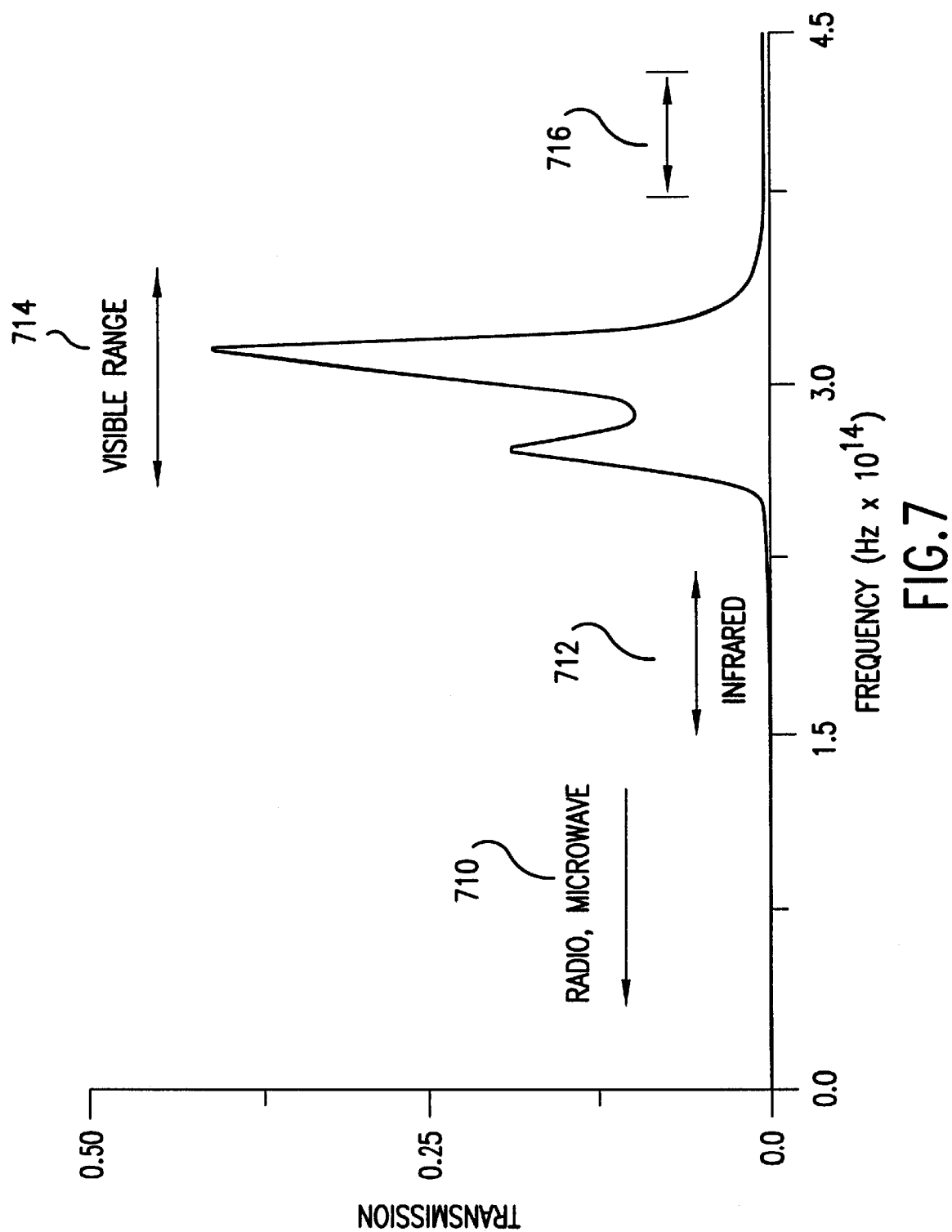
FIG. 7 is a transmission vs. frequency profile for a three-period PBG structure based on a Drude model calculation, in accordance with an embodiment of the present invention.

FIG. 7 displays the results of a calculation of the transmission versus frequency for the metal PBG structure 602 modeled using the dielectric constant derived from a Drude model calculation. See *Classical Electromagnetic Radiation*, by J. B. Marion, Academic Press, 1965. Briefly, the Drude model is an extension of the classical theory of electrons for metals. It provides an accurate theoretical representation of the dielectric constant (or index of refraction and absorption characteristics) for most metals, including silver, for a range that includes low-frequency radio waves and high-frequency ultraviolet light.

FIG. 7 shows that the transmission of light is suppressed for all frequencies 710 and 712 up to the visible range 714, where a maximum of approximately 50% is transmitted through the PBG device 602. In addition, a band gap characterizes a good portion of the UV frequency range 716, which as a result is also suppressed, as shown in FIG. 7. The small-frequency range depicted in FIG. 7 includes all communication frequency bands, microwave, and IR light. The calculation represented by FIG. 7 also suggests that in the limit of zero-frequency, i.e., ELF and VLF radiation, the transmission is suppressed down to levels better than 1 part in 10,000 of the incident photonic signal intensity values. Therefore, FIG. 7 represent the theoretical realization of what is referred to as a "transparent metal structure": it is transparent in the visible range, it functions as a good metal reflector at lower frequencies, and it suppresses UV light to a substantial degree.

This preferred embodiment of a transparent metal PBG structure, such as PBG structure 602, can also be fabricated using alternative material layers. Additionally, many different metals and dielectric or semiconductor thicknesses can be used as well. For example, by keeping the total silver thickness constant at about 90 nm, the transmission through the transparent metal structure can improve to an average of 60% with a total of eighteen layers; i.e., nine metal layers each 10 nm in thickness, and nine $MgF_2$ layers each 140 nm in thickness. This improvement in transmission suggests that by modifying each metal layer and each $MgF_2$ layer independently, the transmission can be even further optimized.

Figure 8:
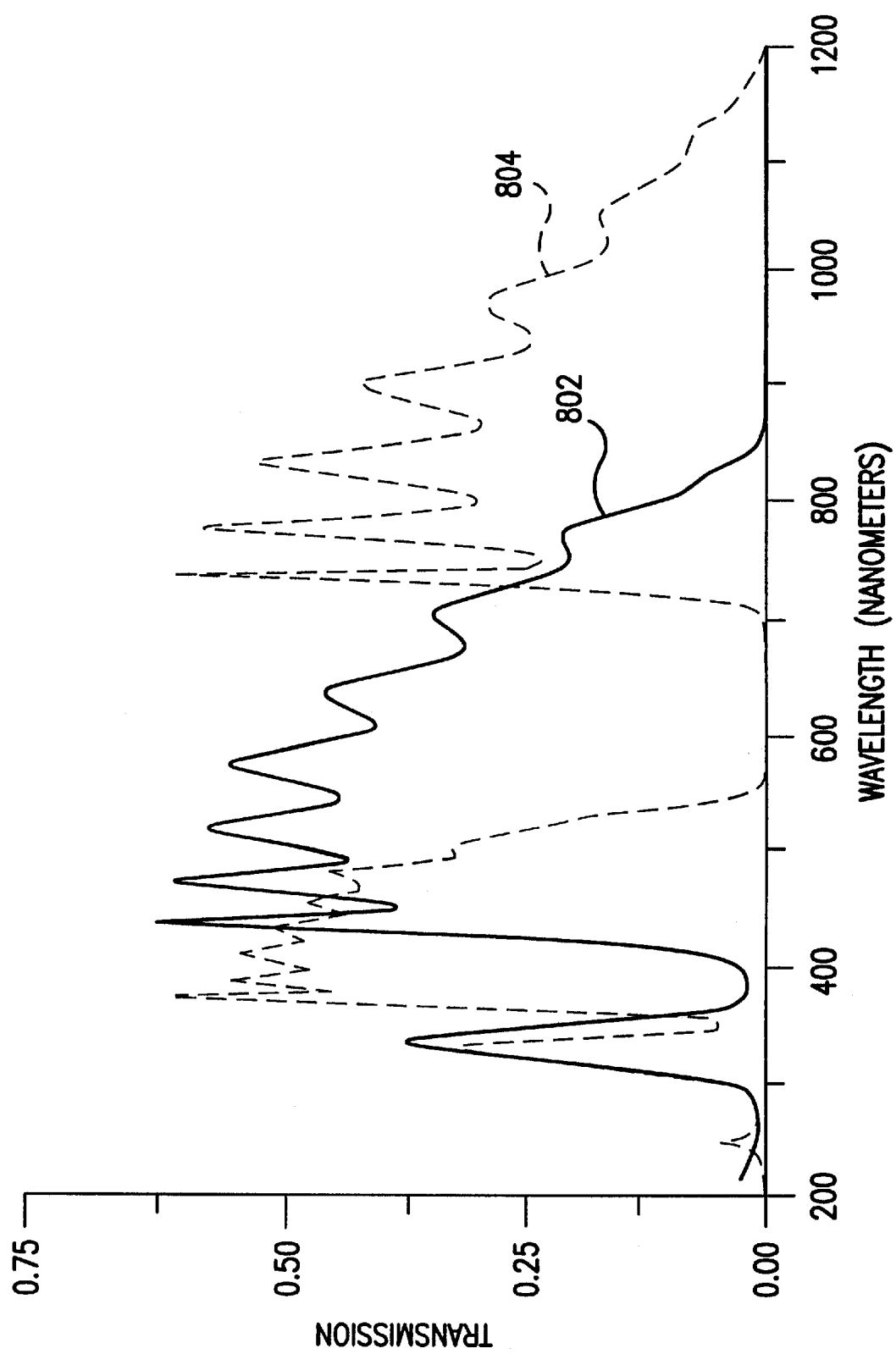
FIG. 8 is a transmission vs. wavelength profile for a nine-period, silver/magnesium fluoride PBG structure, where the silver layers are 10 nm thick and the magnesium fluoride layers are 140 nm thick (solid line), and where the silver layers are 10 nm thick and the magnesium fluoride layers are 250 nm thick (dotted line), in accordance with an embodiment of the present invention.

FIG. 8 (solid line 802) is a representation of the transmission for the eighteen layer structure described above. In addition to controlling the magnitude of suppression of certain wavelengths of light, the present invention also provides for the control of the wavelength range where light is transmitted. This wavelength range control is accomplished by either increasing or decreasing the thickness of the $MgF_2$ layers, and by altering the thickness of the metal layers to a lesser degree. For example, FIG. 8 shows an example of this change in transmission profile. Solid line 802 represents an eighteen layer structure, where each Ag layer is 10 nm thick, and each $MgF_2$ layer is 140 nm thick. Dotted line 804 represents the transmission of a similar eighteen layer, where each Ag is 10 nm thick, but where each $MgF_2$ layer is approximately 250 nm in thickness. Thus, as illustrated in FIG. 8, more uniform transmission in the visible range can be achieved when one of the higher order pass bands is tuned to the visible wavelength range. The desired transmission profile is accomplished by utilizing thicker interstitial (dielectric or semiconductor) layers. These transmission profiles 802 and 804 help illustrate the flexibility of the present invention.

According to the present invention, the thicknesses of either the metal layers or the dielectric (or semiconductor) layers can be chosen dependant upon the specific application. Cost can also be a driving factor in PBG device design. Transparent metal PBG devices with fewer periods are generally cheaper to 1manufacture, while the thickness of very thin metal films are more difficult to control. Further embodiments of the present invention can use a combination of two or more metals, and/or two or more types of dielectric or semiconductor materials within the same PBG structure, without any significant departure from the basic characteristics already described.

Thus, the present invention demonstrates that light can be transmitted through thin or thick, periodic, metallic structures. Additionally, the thickness of the dielectric or semiconductor sandwiched between the metal films can be controlled, as well as the thickness of each metal film, in order to tune the transparency regions of the transparent metal PBG device. Just as significantly, while the transparent metal PBG device exhibits a transparency window in the visible range of frequencies, all lower frequencies (or longer wavelengths), as well as a substantial portion of the UV range, are rejected by a substantial amount.

Further, the present invention encompasses several different methods of providing a tunable transparency window (or pass band). As mentioned above, controlling the wavelength range where light is transmitted can be accomplished by increasing or decreasing the thickness of the interstitial $MgF_2$ layers. Other methods of tuning the transparency window include adding more periods to the structure and applying an external electric field to the transparent metal PBG device. These tuning methods are described in detail below.

According to another embodiment of the present invention, it is possible to use dielectric or semiconductor materials as interstitial layers sandwiched between the metal layers such that their index of refraction is a sensitive function of an externally applied field. Modification of the index of refraction is equivalent to adjusting the optical path length of the layer. Therefore, the transparent wavelength range can be tuned (or moved on the wavelength axis) with the application of a static field, as for example, in the electro-optic effect.

Further, the transparent window can be changed dynamically by a time-varying field that propagates through the transparent metal PBG structure for applications to optical limiting, switching, and optical diode behavior. For example, increasing the input intensity can cause increased reflections and drastically reduced transmission in the case of an optical limiter, and unidirectional propagation in the case of an optical diode.

5. Experimental Results of a Transparent Metal PBG Photonic Device

Figure 6A:
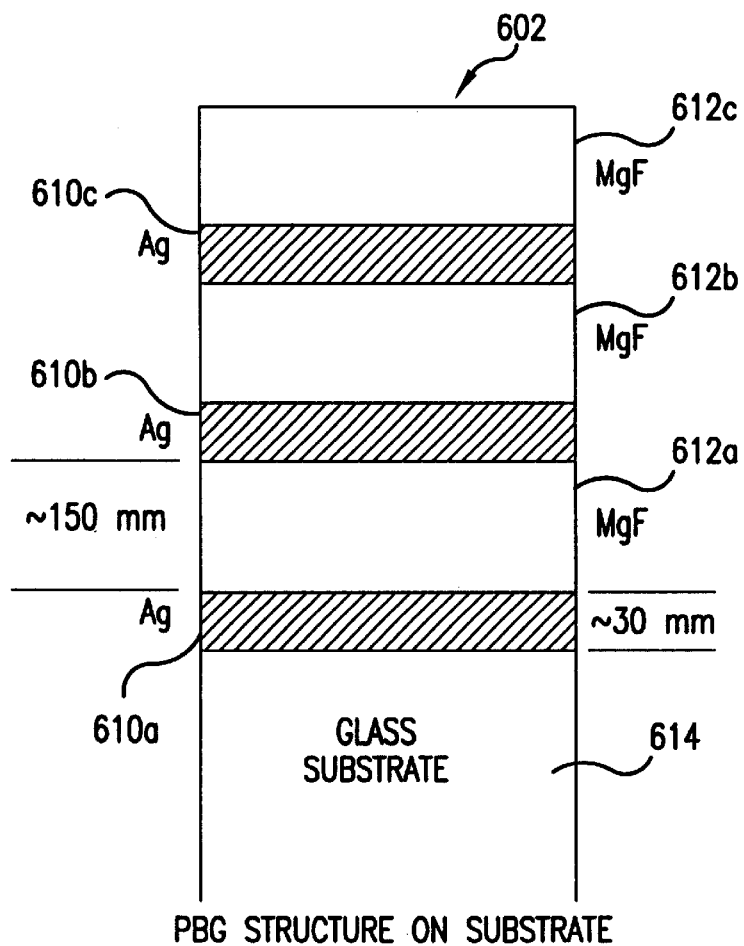
FIG. 6A is a schematic representation of a three-period PBG structure, in accordance with an embodiment of the present invention.
Figure 6B:
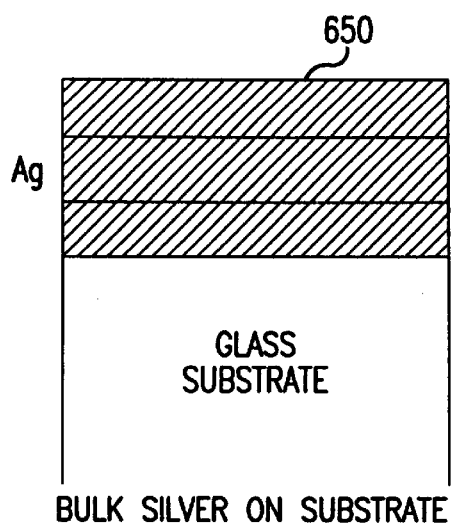
FIG. 6B is a schematic representation of a 90 nm thick silver film on a substrate.

Recall that FIG. 6A shows a schematic representation of a device 602 that is referred to as a "transparent metal PBG structure" according to the present invention. The transparent metal PBG device 602 receives a photonic signal of wavelength λ. The photonic signal is partially transmitted by the transparent metal PBG device 602 only if the wavelength λ is found within the ranges outside of the photonic band gaps, such as those depicted in FIG. 8 (described above).

Also recall that the transparent metal PBG device 602 of FIG. 6A is a PBG structure that includes a plurality of first and second alternating layers (also referred to as a multilayer stack). The layers alternate between silver layers 610a–610c, whose index of refraction has value $n_2$ that is a function of wavelength, and $MgF_2$ glass layers 612a–612c, whose index of refraction has value $n_1$, which is also a function of wavelength.

For example, a transparent metal PBG device similar to the device 602, from FIG. 6A described above, was fabricated and tested. The experimental device comprises: (1) a rectangular glass substrate (similar to substrate 614), about 5 cm long and 2.5 cm wide; (2) three Ag layers (similar to layers 610a–610c), each approximately 27.5 nm in thickness; and (3) two $MgF_2$ layers (similar to layers 612a–612b) each approximately 156 nm thick, in the order, Substrate/Ag/$MgF_2$/Ag/$MgF_2$/Ag.

The first Ag layer 610a was deposited by conventional vacuum evaporation techniques on substrate 614. In this example, a glass substrate 614 was used, whose index of refraction is 1.51. However, any other suitable substrates (such as plastics or other materials) can be used without affecting the fundamental transmission and reflection properties of the transparent metal PBG device 602. In addition, the experimental device was designed so that its transmission would be a maximum at green wavelengths (around 520 nm).

The second layer, $MgF_2$ layer 612a, was grown by conventional vacuum evaporation techniques on the first Ag layer 610a. The Ag and $MgF_2$ vacuum evaporation processes were repeated to add subsequent layers. For simplicity, the third and final $MgF_2$ layer 612c was omitted without affecting the overall properties of the transparent metal PBG device 602.

Moreover, a three-period structure was chosen as a preferred embodiment of the present invention because with fewer than three periods (or in this case, fewer than three metal layers) the band structure of the device is not well defined. For example, calculations were performed on a structure utilizing only two metal layers (i.e., a two period structure). Each metal layer can be greater than 50 nm thick in the two period structure, which still provides approximately 10 to 15 percent transmission in the visible range (i.e., less than 1 dB of suppression). This transmission magnitude is similar to what is found in conventional, tinted car windows. However, the resonance peaks created in the photonic band gap structure are not very broad. Calculations similar to those described above show that the band structure becomes well defined once a rudimentary periodicity (i.e., greater than two periods) is built into the PBG device. Additionally, the bandwidth of the pass band (i.e., the transparency region) tends to increase with the number of periods in the PBG device. Thus, while the two period structure can operate as a filter, according to the present invention, it is preferred to utilize more periods in order to control the transmission characteristics of PBG device.

Figure 9:
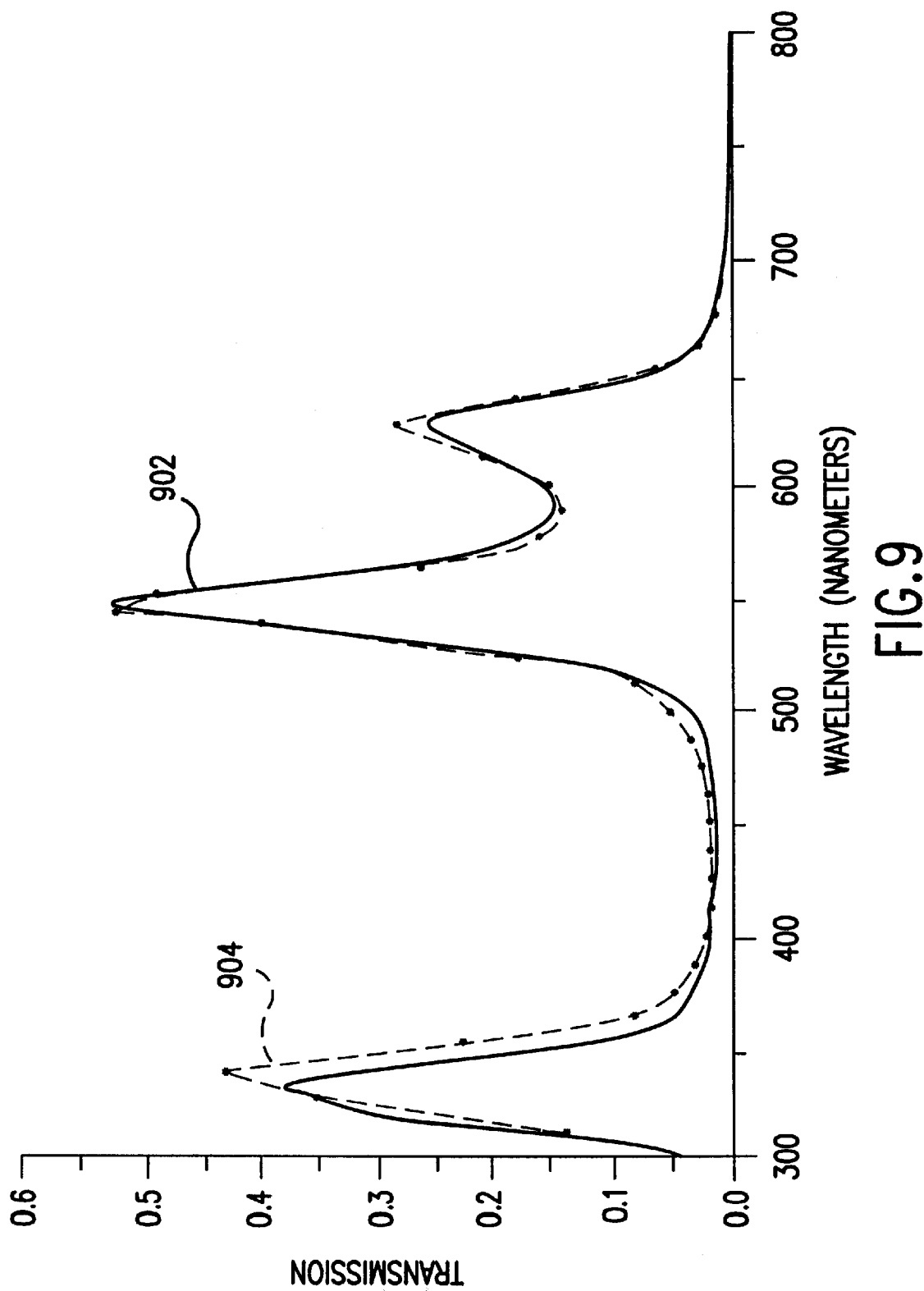
FIG. 9 is the theoretical (solid line) and experimental (dotted line) transmission vs. wavelength profile for the preferred embodiment of the present invention, a 3-silver layer, 2 magnesium fluoride layer, PBG structure.

The calculated theoretical transmission for this transparent metal PBG device 602 is shown in FIG. 9, solid line 902. Dotted line 904 represents the actual transmission for the experimental transparent metal PBG device 602, and is described further below.

The structure of transparent metal PBG device 602 can be modified to include thicker $MgF_2$ layers. For example, increasing the thickness of each inner $MgF_2$ layer to 200 nm causes the band structure of curves 902 and 904 of FIG. 9 to shift up in wavelength, in analogy to the example discussed in connection with FIG. 8. In addition, the maximum transmission can be further increased by at least 10% by adding a third and final $MgF_2$ layer 612c, with a thickness of 100 nm instead of 200 nm. Therefore, the overall transmission can be enhanced by changing the thickness of the individual layers comprising the transparent metal PBG device.

After the experimental transparent metal PBG device was fabricated, two tests were conducted. In the first test, photonic signals of wavelengths in the range between 300 and 900 nm were delivered to the transparent metal PBG device. The results of this experiment are shown in FIG. 9, dotted line 904. Some small disagreements between theory (solid line 902) and experiment (dotted line 904) can be identified in FIG. 9. However, this minor discrepancy is due to the uncertainty in material layer thickness that occurs in the evaporation chamber. Overall, the agreement between theory (solid line 902) and experiment (dotted line 904) is nevertheless extremely good. In this case, the error is approximately 1 to 5 percent. However, this error value is inherently due to the vacuum deposition process used to grow the PBG structure. This error can be reduced by refining the deposition technique (e.g., using an ion sputtering deposition technique).

A second test was conducted to verify that the experimental transparent metal PBG device was also a good reflector of microwave radiation, as predicted in FIG. 7. The second test employed a microwave transmitter and receiver that operated in the range 2 to 20 GHz (or $10^9$ Hz), which is a regime where the photonic signal wavelength varies from approximately 1 to 15 centimeters (cm). In particular, this test was conducted to compare the shielding abilities of a standard copper metal plate several millimeters in thickness with the experimental device. This comparison is shown in FIGS. 10 and 11.

Figure 10:
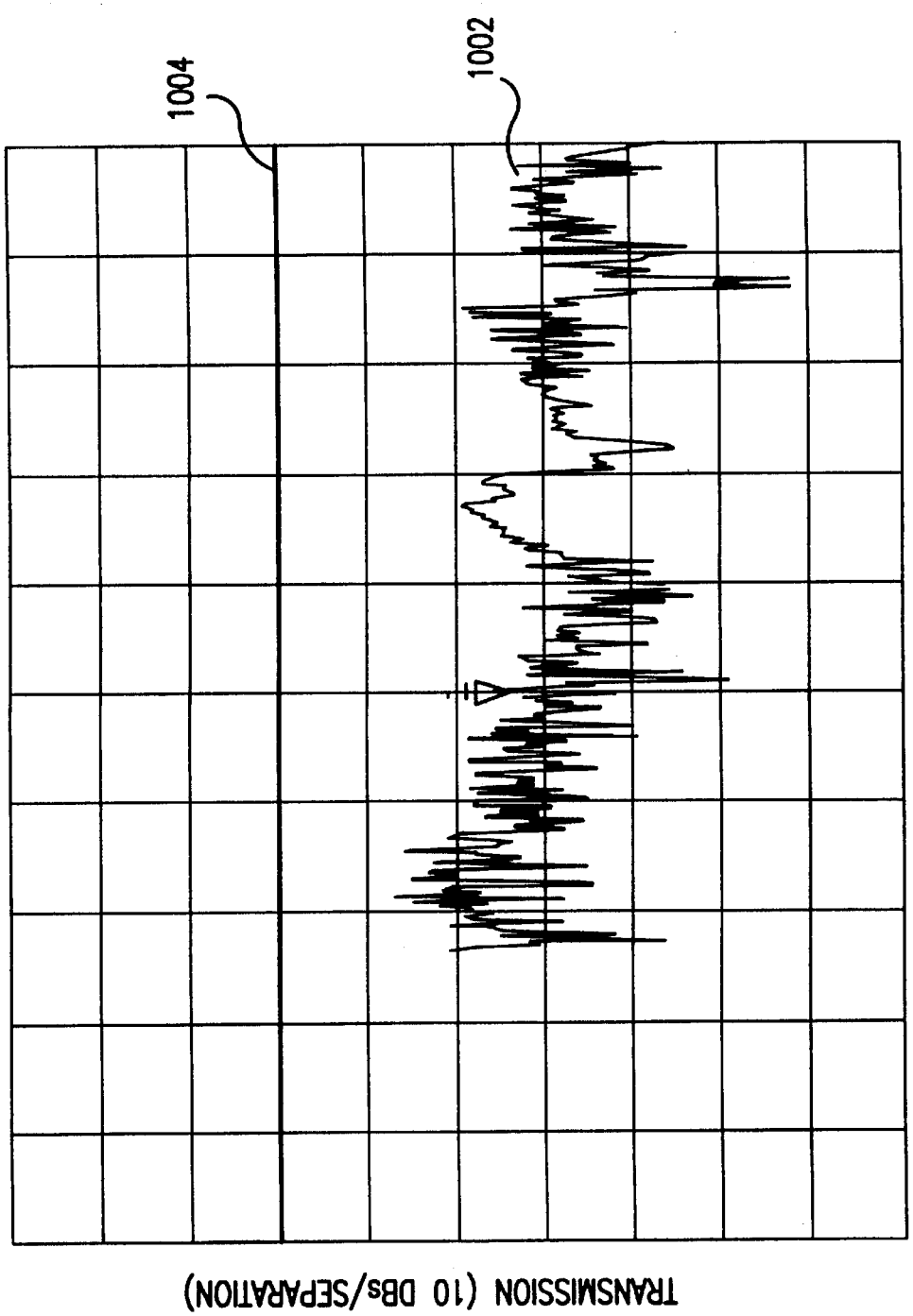
FIG. 10 is a transmission vs. frequency profile of an example copper plate at microwave wavelengths.

FIG. 10, signal 1002 shows the microwave response of the standard copper shield by plotting transmission versus frequency. Along the y-axis, each separation is equivalent to a drop of 10 dBs. The signal 1002 at the receiver is suppressed between 30 and 40 dBs with respect to free space reception for the range 2–20 GHz, which is indicated by the thick, horizontal line 1004.

Figure 11:
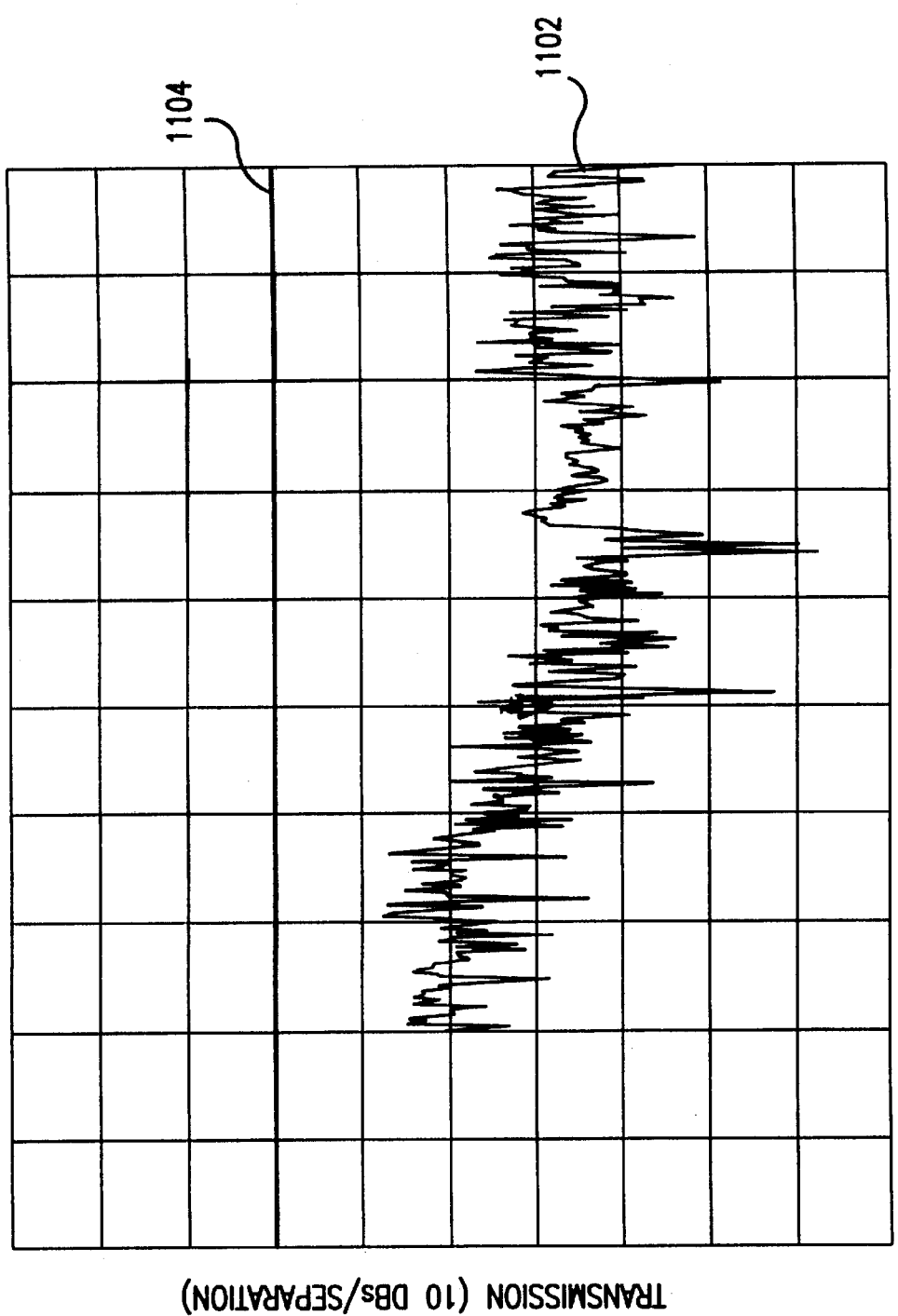
FIG. 11 is a transmission vs. frequency profile of a preferred PBG sample at microwave wavelengths, in accordance with an embodiment of the present invention.

Similarly, in FIG. 11, signal 1102 represents the microwave performance of the experimental transparent metal PBG device. Again, the free space reception for the range 2–20 GHz is indicated by the thick, horizontal line 1104. These results are in excellent agreement with the theoretical predictions presented in FIG. 7. Comparing FIGS. 10 and 11 illustrates that the suppression by the experimental PBG device at the receiver is at least as good as the metallic copper plate. Thus, this comparison verifies that the experimental PBG device is indeed a "transparent metal structure."

6. Applications of the Present Invention

The following discussion is by way of example and is not intended to be a limitation of the possible applications of the present invention. As described above, the present invention provides for a device and a method of fabricating a transparent metal structure that allows the propagation of visible light, while shielding against all other, possibly harmful electromagnetic radiation. The transparent metal device provides a potential user a great deal of flexibility in that the transparent metal PBG device can be tailored to increase the signal output in the desired transparent frequency range and suppress the intensity throughput of unwanted radiation. As a result, very broad shielding performance, coupled with high attenuation of unwanted radiation, can be achieved by the present invention through the use of a PBG structure.

This broad shielding capability (one that can encompass the wavelength regions on both sides of the visible region of the electromagnetic spectrum) has a wide range of commercial, industrial, and scientific applications. For example, the present invention can operate to shield (or filter) radiation at very low frequencies (VLF) and extremely low frequencies (ELF). Thus, the transparent 1metal PBG techniques described above can be utilized in designing filter or shield coatings for television screens and monitors, as well as for cathode ray tubes, thereby enhancing the display capabilities of these devices. The present invention allows for sufficient transmission of visible radiation, while blocking VLF, ELF, and ultraviolet (UV) emissions from these display devices. Additionally, the present invention can be used to coat waveguides to reduce losses.

Moreover, the present invention can be used in place of Indium Tin Oxide for applications requiring a transparent conductor. For example, these applications include touch panel displays, liquid crystal displays, and liquid crystal windows.

Another application for the present invention, provides human eye protection in the form of sun glasses (to block UV light), laser safety glasses or goggles (which can attenuate harmful UV, visible, and IR radiation from Class IV laser sources), and arc-welding shields. Additionally, the transparent metal PBG structure can be incorporated into an optical coating that can be used, for example, to coat optics mirrors and windows (to transmit some wavelengths of interest and reflect other wavelength ranges), to protect paintings that are susceptible to UV radiation, or to coat compact disks (to prevent the aging effects due to prolonged sunlight exposure).

A further application for the present invention provides a method of fabricating thermal windows, which block IR radiation completely, while achieving good transparency levels in the visible spectrum. As shown above, IR transmission levels can be attenuated down to below $10^{-7}$, while still providing at least 50% transmission or better in the visible. Commercially, the present invention can be used, for example, in automotive glass coating techniques to provide a cooler automobile interior even under conditions of continued exposure to sunlight, leading to lower cooling costs.

Additionally, the present invention can be used in a variety of microwave applications. For example, microwave oven windows can be coated according to the present invention in order to confine microwave radiation inside the cavity while still allowing substantial visibility through the window.

Another application of the present invention involves sensor protection and packaging. Screening an electronic circuit according to the transparent metal PBG techniques described above can lead to a decrease in the weight of shielding material. For example, in space applications, weight reduction is crucial due to launch payload restrictions.

Further, the present invention provides for efficient electromagnetic signature reduction. For example, a transparent metal PBG shield does not allow any frequency that would represent noise from escaping an electronic device cavity, thus lowering the probability of interception of electronic signals generated by the electronic device. The advantage of the present invention provides for signature reduction, while still allowing a user to see through the shielding device. The transparent metal PBG structure can also be used as a conductive element in an electronic circuit.

In addition, the present invention provides a technique for fabricating a decorative transparent window, whose tint changes with the time of day. The transmitted color depends on the angle at which sunlight is incident on the window.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all articles and patent documents mentioned above are incorporated by reference herein.

What is claimed is:

1. A transparent metal photonic band gap device, comprising:
   a first metal layer having a first metal thickness;
   a first interstitial layer having a first interstitial thickness formed on said first metal layer;
   a second metal layer having a second metal thickness formed on said first interstitial layer;
   a second interstitial layer having a second interstitial thickness formed on said second metal layer;
   a third metal layer having a third metal thickness formed on said second interstitial layer, wherein said thicknesses of said metal and interstitial layers are selected to form a photonic band gap structure having a transmission resonance range on at least one side of a photonic band gap range, the photonic band gap structure permitting transmission of light at wavelengths in a first wavelength range within the transmission resonance range and suppressing transmission of light at wavelengths in a second wavelength range within the photonic band gap range.

2. The device of claim 1, further comprising at least one of:
   third interstitial layer having a third interstitial thickness formed on said third metal layer; and
   a substrate to support said first metal layer.

3. The device of claim 2, wherein said substrate is transparent.

4. The device of claim 1, wherein said first, second, and third metal layers are selected from a group comprising all transition metal.

5. The device of claim 1, wherein said first, second, and third metal layers are selected from a group comprising silver, aluminum, copper, and gold.

6. The device of claim 1, wherein said first, second, and third metal layers are silver.

7. The device of claim 1, wherein said first, second, and third metal thicknesses are each between approximately 2.5 to 5 nanometers (nm) and approximately 40 to 60 nm.

8. The device of claim 1, wherein said first and second interstitial layers are selected from a group comprising semiconductor materials, ordinary dielectrics, and a combination of semiconductor and dielectric materials.

9. The device of claim 1, wherein said first and second interstitial layers comprise Magnesium Fluoride ($MgF_2$).

10. The device of claim 1, wherein said first and second interstitial thicknesses are each between approximately 2.5 to 5 nanometers (nm) and 300 to 500 nm.

11. The device of claim 1, wherein said first wavelength range comprises the visible wavelength region of the electromagnetic spectrum.

12. The device of claim 1, wherein said first wavelength region comprises the ultraviolet wavelength region of the electromagnetic spectrum.

13. The device of claim 1, wherein said first wavelength region comprises the infrared wavelength region of the electromagnetic spectrum.

14. The device of claim 1, wherein said second wavelength range comprises the infrared (IR) region of the electromagnetic spectrum.

15. The device of claim 1, wherein said second wavelength range comprises the ultraviolet (UV) region of the electromagnetic spectrum.

16. The device of claim 1, wherein said second wavelength range comprises the infrared region to the microwave region of the electromagnetic spectrum.

17. The device of claim 1, wherein said second wavelength range comprises the visible region of the electromagnetic spectrum.

18. The device of claim 2, further comprising:
   a plurality of metal layers having said first metal thickness, wherein said second and third metal thicknesses equal said first metal thickness; and
   a plurality of interstitial layers having said first interstitial thickness, wherein said second and third interstitial thicknesses equals said first interstitial thickness, wherein said plurality of metal and interstitial layers are arranged in an alternating manner, and wherein said plurality of metal and interstitial layers corresponds to said first and second wavelength ranges.

19. The device of claim 1, further comprising:
   a voltage source, coupled to said interstitial layers, to create an applied electromagnetic field, wherein an optical path length of said interstitial layers is altered.

20. The device of claim 19, wherein the first transmission range is tunable.

21. The device of claim 1, wherein the first, second, and third metals layers are silver, to transmit a selected magnitude of UV radiation.

22. The device of claim 1 having a dynamically tunable first transmission range, wherein incident photonic signals interact with said first and second interstitial layers to alter an optical path length of said first and second interstitial layers.

23. The device of claim 1, wherein each of said first to third metal layers comprises silver and the sum of said first to third metal thicknesses is greater than 33 nm.

24. The device of claim 1, wherein the device can have thicknesses selected such that said first wavelength range comprises at least visible wavelengths between 400 nm to 700 nm; and said second wavelength range comprises at least one of UV, IR or microwave regions of the electromagnetic spectrum.

25. The device of claim 1, further comprising at least one additional metal layer wherein each first to third metal layer and additional metal layer comprises silver, the sum of said first to third metal thicknesses and each additional metal layer thickness being equal to or greater than 100 nm; whereby, the device has a conductivity such that the device can be substituted for indium tin oxide in liquid crystal applications.

26. The device of claim 1, wherein the device has at least of one a total of 20 silver layers and 40 silver layers.

27. The device of claim 1, wherein said transmission of light at wavelengths in said first wavelength range corresponds to at least 40 percent transmission and transmission of light at wavelengths in said second wavelength range corresponds to no more than $10^{-5}$ transmission.

28. The device of claim 1, wherein said first wavelength region comprises an infrared wavelength region including near infrared wavelength between 3–5 microns.

29. The device of claim 1, wherein said first wavelength region comprises an infrared wavelength region including far infrared wavelength between 8–12 microns.

30. A transparent metal photonic band gap device comprising:
   a first metal layer having a first metal thickness;
   a first interstitial layer having a first interstitial thickness formed on said first metal layer;
   a second metal layer having a second metal thickness formed on said first interstitial layer;
   a second interstitial layer having a second interstitial thickness formed on said second metal layer;
   a third metal layer having a third metal thickness formed on said second interstitial layer, wherein an arrangement of said metal and interstitial layers exhibits a photonic band gap structure that permits transmission of light at wavelengths in a first wavelength range and suppresses transmission of light at wavelengths in a second wavelength range;
   further comprising at least one of:
      a third interstitial layer having a third interstitial thickness formed on said third metal layer; and
      a substrate to support said first metal layer;
   wherein said first, second, and third metal layers are silver and said first, second, and third metal layer thicknesses are each approximately 27.5 nm, wherein said first and second interstitial layers are $MgF_2$ and said first and second interstitial thicknesses are each approximately 156 nm, wherein said first wavelength range comprises the group of wavelengths between approximately 530 and 560 nm, wherein the second wavelength range comprises the IR and microwave wavelength regions, and wherein said transmission of light at wavelengths in said first wavelength range corresponds to approximately 40 percent transmission and said transmission of light at wavelengths in said second wavelength range corresponds to approximately $10^{-5}$ transmission.

31. An optical filter, comprising:
   a plurality of metal layers, each of said plurality of metal layers having a predetermined thickness; and
   a plurality of interstitial layers, each of said plurality of interstitial layers having a predetermined thickness, wherein said plurality of metal layers and said plurality of interstitial layers are arranged in an alternating manner and each of said predetermined thicknesses are selected to form a photonic band gap (PBG) structure, wherein said PBG structure transmits light at wavelengths in a first wavelength range and wherein said PBG structure reflects light at wavelengths in a second wavelength range, and wherein said predetermined thicknesses of said plurality of metal layers and said plurality of interstitial layers correspond to said first and second wavelength ranges.

32. A method for creating a transparent metal photonic band gap device, comprising the steps of:
   (1) forming a first metal layer to a transparent substrate, wherein the first metal layer has a first metal layer thickness;
   (2) forming a first interstitial layer on the first metal layer, wherein the first interstitial layer has a first interstitial thickness, wherein a structure comprising the first metal layer and the first interstitial layer forms a first period;
   (3) forming a second period comprising a second metal layer and a second interstitial layer onto the first period; and
   (4) forming a third period comprising a third metal layer and a third interstitial layer onto the second period, wherein each of said thicknesses of said metal and interstitial layers is selected to form a photonic band gap structure permitting transmission of light at wavelengths in a first selected wavelength range and suppressing transmission of light at wavelengths in a second selected wavelength range.

33. The method of claim 32, further comprising the step of:
   (5) forming a predetermined number of additional periods onto the device, wherein a greater number of periods corresponds to an increased first selected wavelength range.

34. The method of claim 32, further comprising the step of:
   (5) independently modifying the metal and interstitial layer thicknesses to optimize the transmission in the first and second selected wavelength ranges.

35. A method for producing a transparent metal photonic band gap device, comprising the steps of:
   (1) selecting a total amount of metal that permits transmission of light at wavelengths in a first selected wavelength range;
   (2) dividing the total amount of metal into a selected number of metal layers, wherein each metal layer has a corresponding metal thickness; and
   (3) interposing an interstitial layer between each metal layer, wherein each interstitial layer has a corresponding interstitial thickness corresponding to suppressing transmission of light at wavelengths in a second selected wavelength range, to form the device having a photonic band gap structure.

36. The method of claim 35, further comprising the step of:
   (4) altering the metal and interstitial layer thicknesses to alter the second selected wavelength range.

37. A method for producing a transparent metal periodically alternating photonic band gap device, comprising the steps of:
   (1) forming a first period comprising a first metal layer and a first interstitial layer; and
   (2) forming a selected number of additional periods onto the first period, wherein the selected number of additional periods and thicknesses of metal and interstitial layers in each period corresponds to a photonic band gap structure that permits transmission of light at wavelengths in a first selected range of wavelengths and suppresses transmission of light at wavelengths in a second selected range of wavelengths.

38. The method according to claim 37, further comprising the step of:

(3) increasing the additional number of periods formed on the first period to increase the first selected range of wavelengths.

39. A method for optimizing the transmission of a first selected range of wavelengths of a transparent metal photonic band gap shielding device that suppresses the transmission of a second selected range of wavelengths by a selected magnitude, comprising the steps of:

(1) choosing a total amount of metal comprising the shielding device;

(2) dividing the total amount of metal into a selected number of metal layers, wherein each metal layer has an individual metal layer thickness; and (3) spacing each individual metal layer apart by a selected thickness to create a plurality of spacing regions, wherein said spacing corresponds to a photonic band gap structure of the shielding device and the first selected range of wavelengths.

40. The method of claim 39, further comprising the step of:

(4) interposing a plurality of interstitial layers into the spacing regions, wherein said interstitial layers are selected from the group comprising semiconductor materials, ordinary dielectrics, and a combination of semiconductor and dielectric materials.

41. The method of claim 40, further comprising the step of:

(5) selecting the metal layers from a group comprising all transition metals.

42. The method of claim 40, further comprising the step of:

(6) applying an external electromagnetic field to the interstitial layers to alter an optical path of said interstitial layers and tune the first selected range of wavelengths.

43. The method of claim 40, further comprising the step of:

(5) selecting the metal layers from a group comprising silver, copper, and gold.

* * * * *